United States Patent
Tsumura et al.

(10) Patent No.: US 11,211,875 B2
(45) Date of Patent: Dec. 28, 2021

(54) POWER CONVERTER, COMPRESSOR, AIR-SENDING DEVICE, AND AIR-CONDITIONING APPARATUS

(71) Applicant: Mitsubishi Electric Corporation, Tokyo (JP)

(72) Inventors: Akihiro Tsumura, Tokyo (JP); Shigeo Takata, Tokyo (JP); Kazunori Sakanobe, Tokyo (JP); Shinsaku Kusube, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 32 days.

(21) Appl. No.: 16/627,380

(22) PCT Filed: Sep. 8, 2017

(86) PCT No.: PCT/JP2017/032405
§ 371 (c)(1),
(2) Date: Dec. 30, 2019

(87) PCT Pub. No.: WO2019/049299
PCT Pub. Date: Mar. 14, 2019

(65) Prior Publication Data
US 2020/0220470 A1    Jul. 9, 2020

(51) Int. Cl.
*H02M 5/458* (2006.01)
*H02M 5/44* (2006.01)
*H02M 1/00* (2006.01)

(52) U.S. Cl.
CPC ........... *H02M 5/458* (2013.01); *H02M 5/44* (2013.01); *H02M 1/007* (2021.05); *H02M 1/0048* (2021.05)

(58) Field of Classification Search
CPC ....... H02M 1/32; H02M 1/007; H02M 1/0048
See application file for complete search history.

(56) References Cited

U.S. PATENT DOCUMENTS

| | | | |
|---|---|---|---|
| 8,508,165 B2 * | 8/2013 | Shinomoto | H02M 1/4208 318/400.3 |
| 10,056,826 B2 * | 8/2018 | Hatakeyama | H02M 1/4225 |

(Continued)

FOREIGN PATENT DOCUMENTS

| | | |
|---|---|---|
| EP | 2 869 451 A1 | 5/2015 |
| JP | H08-107676 A | 4/1996 |

(Continued)

OTHER PUBLICATIONS

International Search Report of the International Searching Authority dated Nov. 14, 2017 for the corresponding international application No. PCT/JP2017/032405 (and English translation).

*Primary Examiner* — Yusef A Ahmed
(74) *Attorney, Agent, or Firm* — Posz Law Group, PLC

(57) ABSTRACT

A power converter that includes a rectifier rectifying a voltage supplied from a three-phase AC power supply, a voltage step-down circuit including a voltage step-down switching element, a reactor, a backflow prevention element, and a smoothing capacitor and stepping down a DC voltage supplied from the rectifier, and an inverter circuit converting the DC voltage smoothed by the smoothing capacitor into an AC voltage. The power converter includes an imbalance determining unit determining, based on states of the voltage step-down circuit and the smoothing capacitor, whether or not voltage imbalance has occurred in the three-phase AC power supply and a voltage step-down control unit performing switching of the voltage step-down switching element in a case where the imbalance determining unit determines that the voltage imbalance has occurred.

17 Claims, 13 Drawing Sheets

(56) References Cited

U.S. PATENT DOCUMENTS

| | | | |
|---|---|---|---|
| 10,320,278 B2* | 6/2019 | Araki | H02M 7/5387 |
| 2005/0068001 A1* | 3/2005 | Skaug | H02M 5/458 |
| | | | 318/807 |
| 2011/0019452 A1* | 1/2011 | Shinomoto | H02M 7/217 |
| | | | 363/126 |
| 2015/0089972 A1* | 4/2015 | Kamiya | F25B 1/005 |
| | | | 62/467 |
| 2015/0280603 A1* | 10/2015 | Yuasa | H02M 1/36 |
| | | | 363/37 |
| 2016/0036317 A1* | 2/2016 | Shimomugi | H02M 7/06 |
| | | | 363/53 |
| 2016/0126854 A1* | 5/2016 | Yuasa | H02M 5/458 |
| | | | 62/508 |
| 2016/0172993 A1* | 6/2016 | Yuasa | H02M 7/04 |
| | | | 318/504 |
| 2016/0248352 A1* | 8/2016 | Shinomoto | H02H 7/1255 |
| 2016/0265822 A1* | 9/2016 | Kamiya | H02M 1/36 |
| 2016/0294312 A1* | 10/2016 | Tsumura | H01L 29/1608 |
| 2016/0380575 A1* | 12/2016 | Tsumura | F25B 49/025 |
| | | | 318/478 |
| 2018/0034403 A1* | 2/2018 | Kim | F24F 11/89 |
| 2018/0287490 A1* | 10/2018 | Yuasa | H02M 7/537 |
| 2018/0367059 A1* | 12/2018 | Tsukano | F24F 1/24 |
| 2019/0334445 A1* | 10/2019 | Ishikawa | H02M 5/458 |
| 2020/0099300 A1* | 3/2020 | Ishikawa | H02M 5/458 |
| 2020/0204101 A1* | 6/2020 | Tokuda | H02P 27/08 |
| 2020/0358365 A1* | 11/2020 | Yuasa | H02M 5/458 |

FOREIGN PATENT DOCUMENTS

| | | |
|---|---|---|
| JP | H08-262085 A | 10/1996 |
| JP | 2004-147388 A | 5/2004 |
| JP | 2007-259629 A | 10/2007 |
| JP | 2010-187521 A | 8/2010 |
| JP | 2011-130619 A | 6/2011 |
| JP | 2013-132118 A | 7/2013 |
| JP | 2013-207925 A | 10/2013 |
| JP | 2013-219985 A | 10/2013 |
| WO | 2014/034207 A1 | 3/2014 |

* cited by examiner

POWER CONVERTER, COMPRESSOR, AIR-SENDING DEVICE, AND AIR-CONDITIONING APPARATUS

CROSS REFERENCE TO RELATED APPLICATION

This application is a U.S. national stage application of International Application No. PCT/JP2017/032405, filed on Sep. 8, 2017, the contents of which are incorporated herein by reference.

TECHNICAL FIELD

The present invention relates to a power converter, a compressor, an air-sending device, and an air-conditioning apparatus that control various motors, based on electric power supplied from a three-phase AC power supply.

BACKGROUND

In conventional technologies, a power converter generates a DC bus voltage for driving an inverter, using a rectifying circuit, from a three-phase AC power supply such as a commercial power supply. The power converter drives a switching element for an inverter circuit using the generated DC bus voltage as a supply source to generate an AC voltage at a desired frequency, and thus controls a motor for a compressor or other devices provided in an air-conditioning apparatus.

The motor has characteristics in which an induced voltage generated inside the motor increases as the rotation speed increases. Therefore, an output voltage from the inverter circuit needs to be increased in accordance with the rotation speed of the motor. Furthermore, in the power converter including the rectifying circuit, the value of the DC bus voltage depends on the magnitude of the voltage supplied from the three-phase AC power supply. Therefore, by causing the switching element for the inverter circuit to perform ON and OFF operations to vary the pulse width, the power converter equivalently varies the value of the voltage to be applied to the motor, and thus applies an appropriate voltage to the motor.

The power converter performs control such that, for example, the pulse width decreases and the voltage equivalently decreases in a region where the rotation speed of the motor is low. Therefore, there arises a problem of an increase in the peak value of the output voltage and a resultant increase in loss such as iron loss inside the motor. Accordingly, for the power converter mounted on the air-conditioning apparatus or other apparatuses, efficiency in a region where the rotation speed of the motor is low needs to be improved.

Conventional power converters include devices including a step-up converter circuit on an output side of a rectifying circuit (see, for example, Patent Literatures 1 and 2). In the power converters in Patent Literatures 1 and 2, the step-up converter circuit repeats ON and OFF operations of a step-up switching element at desired time intervals and uses energy of a reactor and a smoothing capacitor. Thus, a DC bus voltage is changed to a desired value and supplied to an inverter circuit.

Furthermore, in the power converter in Patent Literature 2, in the case where the magnitude of voltage imbalance on the power supply side is larger than a predetermined value, a step-up operation of the step-up converter is continued.

PATENT LITERATURES

Patent Literature 1: Japanese Unexamined Patent Application Publication No. 2010-187521
Patent Literature 2: Japanese Unexamined Patent Application Publication No. 2013-207925

However, in the power converters in Patent Literatures 1 and 2, when voltages of phases of the three-phase AC power supply become unbalanced, a ripple current flowing in the smoothing capacitor increases. Therefore, there arises a problem of shortening of the life span of the smoothing capacitor and an unstable operation of the converter itself caused by an increase in the temperature of the smoothing capacitor. In addition, in the case where the voltage imbalance is corrected as in the power converter in Patent Literature 2, the step-up circuit is operated in the voltage unbalanced state. Therefore, a problem occurs in which the DC bus voltage unnecessarily increases and loss is thus increased.

SUMMARY

The present invention is designed to solve the problems mentioned above, and an object of the present invention is to provide a power converter, a compressor, an air-sending device, and an air-conditioning apparatus that achieve a stable operation while suppressing shortening of the life span of a smoothing capacitor and decreasing loss.

A power converter according to an embodiment of the present invention includes a rectifier rectifying a three-phase AC voltage supplied from a three-phase AC power supply; a voltage step-down circuit including a voltage step-down switching element, a reactor, a backflow prevention element, and a smoothing capacitor and stepping down a DC voltage supplied from the rectifier; an inverter circuit converting the DC voltage smoothed by the smoothing capacitor into an AC voltage; a voltage step-down control unit controlling an operation of the voltage step-down circuit, and an imbalance determining unit determining, based on states of the voltage step-down circuit and the smoothing capacitor, whether or not voltage imbalance has occurred in the three-phase AC power supply. The voltage step-down control unit is configured to perform switching of the voltage step-down switching element in a case where the imbalance determining unit determines that the voltage imbalance has occurred.

A compressor according to an embodiment of the present invention includes the power converter; and a compressor motor driven by the power converter. An air-sending device according to an embodiment of the present invention includes the power converter; a fan motor driven by the power converter; and a fan rotated by the fan motor as a power source. An air-conditioning apparatus according to an embodiment of the present invention includes the power converter; and a motor driven by the power converter.

According to the present invention, in the case where voltage imbalance has occurred in a three-phase AC power supply, switching of a voltage step-down switching element in a voltage step-down circuit is performed. Therefore, an increase in a ripple current and a temperature increase in a smoothing capacitor can be suppressed. Thus, a stable operation can be achieved while shortening of the life span of the smoothing capacitor and loss being suppressed.

DETAILED DESCRIPTION

Embodiment 1

Figure 1:
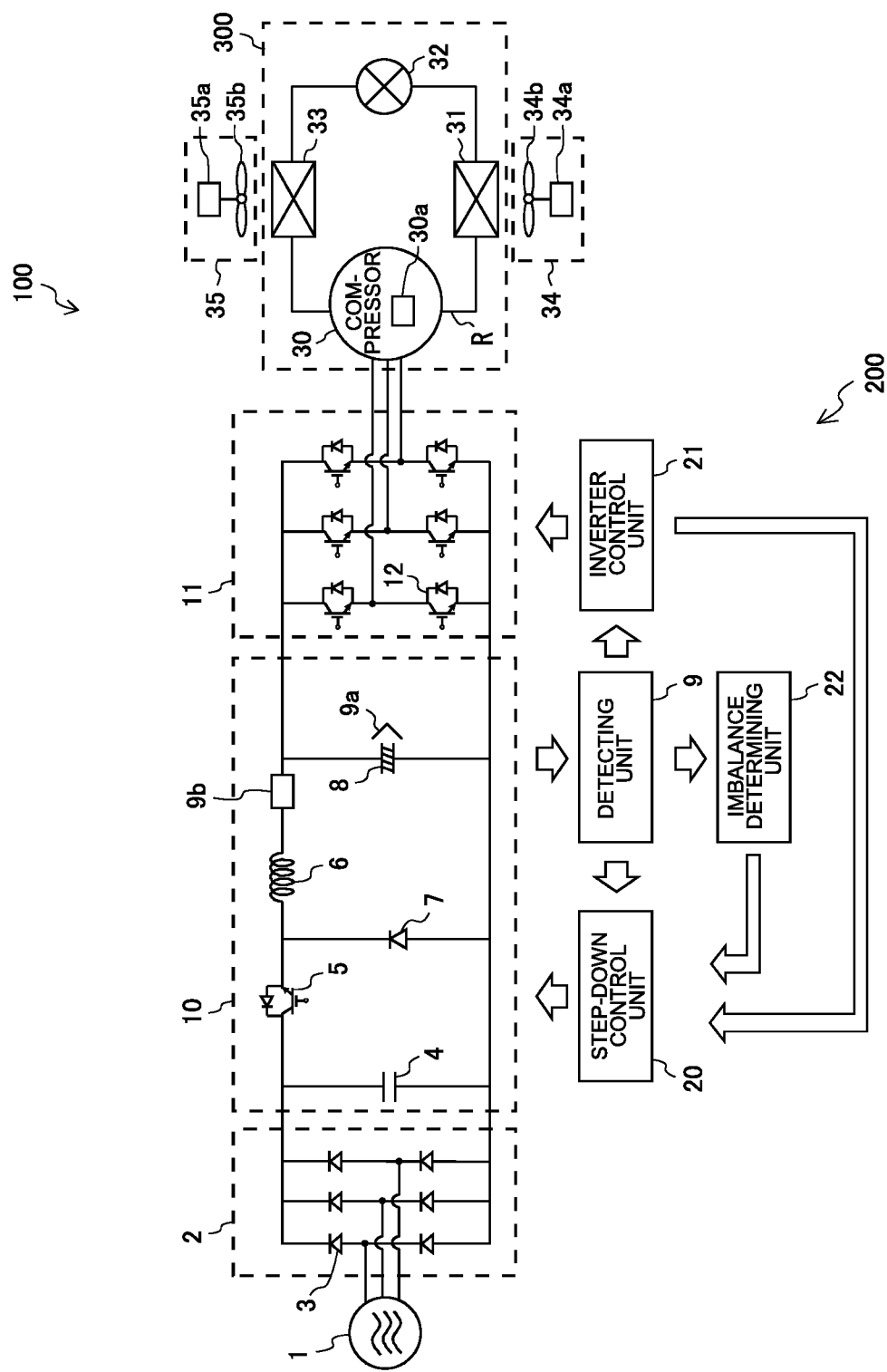
FIG. 1 is a schematic diagram illustrating a configuration of an air-conditioning apparatus that includes a power converter according to Embodiment 1 of the present invention.
Figure 2:
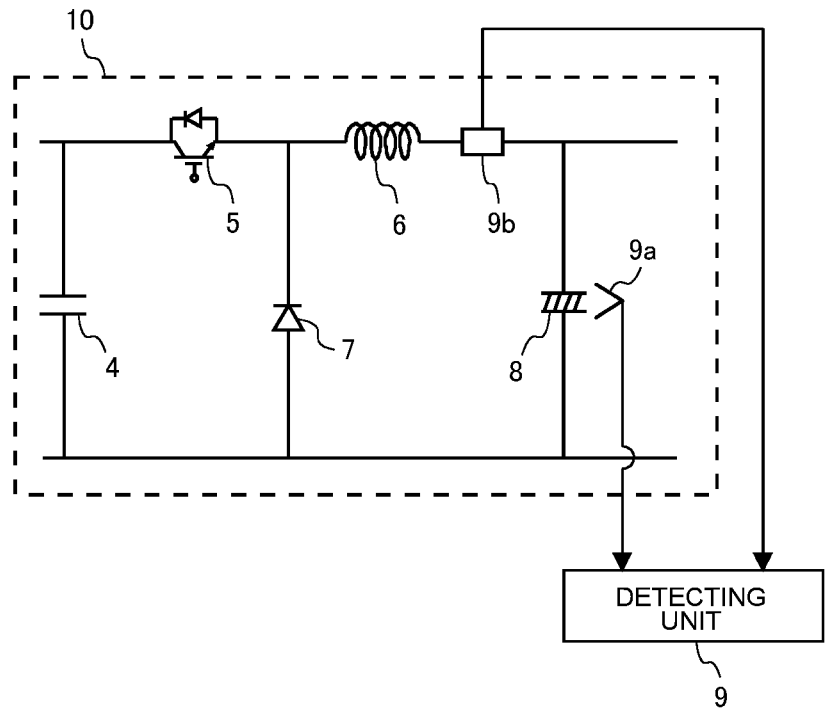
FIG. 2 is a schematic diagram illustrating the relationship of a detecting unit and each detector in FIG. 1.

FIG. 1 is a schematic diagram illustrating a configuration of an air-conditioning apparatus that includes a power converter according to Embodiment 1 of the present invention. FIG. 2 is a schematic diagram illustrating the relationship of a detecting unit and each detector in FIG. 1. The entire configuration of an air-conditioning apparatus 100 will be described with reference to FIGS. 1 and 2.

As illustrated in FIG. 1, the air-conditioning apparatus 100 includes a power converter 200 and a refrigerant circuit 300. The refrigerant circuit 300 is formed such that a compressor 30, a condenser 31, an expansion device 32, and an evaporator 33 are connected by a refrigerant pipe R. The compressor 30 compresses sucked refrigerant and discharges the compressed refrigerant. The compressor 30 is operated by a compressor motor 30a, as a power source, that is controlled by an inverter. The condenser 31 includes, for example, a fin-and-tube-type heat exchanger and condenses refrigerant discharged from the compressor 30.

The expansion device 32 includes, for example, an electronic expansion valve and decompresses refrigerant that has passed through the condenser 31. The evaporator 33 includes, for example, a fin-and-tube-type heat exchanger and evaporates refrigerant that has been decompressed and expanded by the expansion device 32.

Furthermore, the air-conditioning apparatus 100 includes a first air-sending device 34 that is attached to the condenser 31 and a second air-sending device 35 that is attached to the evaporator 33. The first air-sending device 34 includes a fan motor 34a that is driven by an inverter and a fan 34b that is rotated by the fan motor 34a as a power source and delivers air to the condenser 31. The second air-sending device 35 includes a fan motor 35a that is driven by an inverter and a fan 35b that is rotated by the fan motor 35a as a power source and delivers air to the evaporator 33.

The power converter 200 controls an operation of a motor, based on AC power supplied from a three-phase AC power supply 1. In Embodiment 1, the power converter 200 is configured to control an operation of the compressor motor 30a. That is, the power converter 200 converts AC power supplied from the three-phase AC power supply 1 into DC power to generate electric power for driving the compressor motor 30a, and supplies the generated electric power to the compressor motor 30a.

The power converter 200 includes a three-phase rectifier 2, a voltage step-down circuit 10, and an inverter circuit 11. The three-phase rectifier 2 rectifies and converts an AC voltage of the three-phase AC power supply 1 into a DC voltage. For example, a voltage of AC 200 V is supplied from the three-phase AC power supply 1. In the example of FIG. 1, the three-phase rectifier 2 is a three-phase full-wave rectifier to which six rectifier diode elements 3 are bridge-connected.

The voltage step-down circuit 10 is a circuit that steps a DC voltage supplied from the three-phase rectifier 2 down to a desired DC voltage. The voltage step-down circuit 10 is feedback-controlled such that a DC bus voltage Vdc detected by a voltage detector 9a, which will be described later, is changed to a desired voltage value. The voltage step-down circuit 10 includes an input filter capacitor 4, a voltage step-down switching element 5, a reactor 6, a backflow prevention element 7, and a smoothing capacitor 8. The voltage step-down switching element 5 has an ON state and an OFF state. ON time and OFF time are set according to the voltage value to be stepped down. The reactor 6 manages supply of electric power to a load side. The backflow prevention element 7 is provided to allow current to flow continuously.

The input filter capacitor 4 is connected to an output unit of the three-phase rectifier 2 and reduces a ripple current at the switching time of the voltage step-down switching element 5. Furthermore, the input filter capacitor 4 operates such that a surge voltage based on Ldi/dt generated at the time when the voltage step-down switching element 5 is turned OFF is reduced. Due to operation of the input filter capacitor 4, an excessive surge voltage is not applied to equipment even in the case where the voltage step-down switching element 5 is turned OFF in a state in which current flows. Therefore, the power converter 200 is able to continue a normal operation. The three-phase AC power supply 1 includes an impedance of the power supply. Therefore, a surge voltage may be generated by L, which represents an inductance component of the impedance of the power supply. The smoothing capacitor 8 smooths a pulse-shaped voltage switched by the voltage step-down switching element 5 and the backflow prevention element 7. That is, the smoothing capacitor 8 is provided to smooth a DC voltage.

The voltage step-down switching element 5 includes a semiconductor element such as a silicon (Si) element. More specifically, the voltage step-down switching element 5 is a semiconductor element such as a MOSFET (Metal-Oxide-Semiconductor Field-Effect Transistor) or an IGBT (Insulated Gate Bipolar Transistor).

The backflow prevention element 7 includes a semiconductor element such as a silicon element. The backflow prevention element 7 may be a semiconductor element such as a fast recovery diode. Furthermore, in the case where switching is performed simply at a frequency about several times the power supply frequency not high-frequency switching, the backflow prevention element 7 may include an inexpensive contact part. For example, a relay that performs switching partially for a power supply period may be adopted as the inexpensive contact part.

At least one of the voltage step-down switching element 5 and the backflow prevention element 7 may include a wide band gap semiconductor, which has a larger band gap than a silicon (Si) element. For example, a silicon carbide (SiC) element, a gallium-nitride (GaN)-based element, or a diamond element may be used as the wide band gap semiconductor.

The voltage detector 9a and a current detector 9b are provided in the voltage step-down circuit 10. The voltage detector 9a is a voltage sensor that detects a potential difference between a P side and an N side of the smoothing capacitor 8 as a DC bus voltage Vdc. That is, the DC bus voltage Vdc represents the voltage across the smoothing capacitor 8, which is stored in the smoothing capacitor 8. The current detector 9b is a current sensor that detects the current flowing in the reactor 6 as a reactor current IL. A DCCT (DC current transducer) that is able to detect a DC component of current may be adopted as the current detector 9b. Furthermore, the current detector 9b may include a shunt resistor with a small resistance, detect the amount corresponding to the voltage drop at the shunt resistor, and convert the detected voltage value into a current value.

The inverter circuit 11 converts DC power smoothed by the smoothing capacitor 8 into three-phase AC power. The inverter circuit 11 includes a plurality of switching elements 12 each including a semiconductor element such as an IGBT. In the example of FIG. 1, the inverter circuit 11 includes six switching elements 12 that are bridge-connected. That is, the inverter circuit 11 converts, by operations of the six switching elements 12, the DC bus voltage Vdc into three-phase AC voltage, and supplies an AC current at a specific frequency to the compressor motor 30a. As with the voltage step-down switching element 5, each of the switching elements 12 may include a wide band gap semiconductor.

Furthermore, the power converter 200 includes a detecting unit 9, a voltage step-down control unit 20, an inverter control unit 21, and an imbalance determining unit 22. Each of the detecting unit 9, the voltage step-down control unit 20, the inverter control unit 21, and the imbalance determining unit 22 may include hardware such as a circuit device implementing a corresponding function mentioned below or an arithmetic device such as a microcomputer and software implementing the function in collaboration with the arithmetic device.

As illustrated in FIG. 2, the detecting unit 9 receives the DC bus voltage Vdc detected by the voltage detector 9a and the reactor current IL detected by the current detector 9b. Then, the detecting unit 9 outputs the detected values received from the voltage detector 9a and the current detector 9b to the voltage step-down control unit 20, the inverter control unit 21, and the imbalance determining unit 22.

The inverter control unit 21 controls the rotation speed of a motor such that the motor exhibits a desired operating ability. As illustrated in FIG. 1, in the case where the inverter control unit 21 is provided in the air-conditioning apparatus 100, the inverter control unit 21 controls the rotation speed of the compressor motor 30a so that a desired refrigeration capacity can be achieved. The rotation speed of the motor is proportional to the frequency of voltage applied. Therefore, the inverter control unit 21 generates three-phase AC voltage at a desired frequency corresponding to the rotation speed required for the motor, so that the rotation speed of the motor can be controlled. Furthermore, in the case where the inverter control unit 21 controls the motor, the inverter control unit 21 controls not only the frequency of the three-phase AC voltage but also the magnitude of the voltage, thus achieving a high-efficient operation of the motor.

When the motor rotates, an induced voltage is generated inside the motor in accordance with a change in an inter-linkage magnetic flux. The rotation speed of the motor and the induced voltage have a relationship in which the induced voltage increases as the rotation speed of the motor increases and the induced voltage decreases as the rotation speed of the motor decreases. Therefore, the magnitude of the voltage output from the inverter circuit 11 needs to be varied in accordance with the induced voltage of the motor. In this respect, for example, when the rotation speed of the motor increases, the inverter control unit 21 adjusts the magnitude, as well as the frequency, of the voltage output from the inverter circuit 11. That is, the inverter control unit 21 sets On time and OFF time of each of the switching elements 12 such that the motor can operate at high efficiency, and performs control such that an appropriate voltage can be output from the inverter circuit 11. Hereinafter, a voltage output from the inverter circuit 11 will also be referred to as an "inverter output voltage".

Regarding the ON time and the OFF time of each of the switching elements 12, the inverter control unit 21 calculates the duration in which the switching element 12 is ON in a fixed period as the ON time, and defines the remaining time in the fixed period as the OFF time. The fixed period is referred to as an inverter carrier period, and the reciprocal of the inverter carrier period is referred to as an inverter carrier frequency. The inverter control unit 21 calculates the ON time and the OFF time to be allocated to each of the six switching elements 12, based on the ON time and the OFF time in the inverter carrier period. That is, the inverter control unit 21 generates signals corresponding to ON and OFF operations of each of the six switching elements 12, and outputs the corresponding signals to the switching element 12. In general, the inverter carrier frequency is controlled within a range from about several kHz to about several ten kHz.

Furthermore, the inverter control unit 21 includes a function for obtaining a modulation factor K that represents the proportion of the output voltage from the inverter circuit 11 in the DC bus voltage Vdc, using Equation (1) mentioned below. For calculation of the modulation factor K, the inverter control unit 21 calculates a voltage command value for obtaining a desired rotation speed, and obtains the DC bus voltage Vdc via the detecting unit 9. Then, the inverter control unit 21 calculates the modulation factor K by multiplying the product of and the voltage command value by the reciprocal of the DC bus voltage Vdc, using Equation (1). The inverter control unit 21 outputs the obtained modulation factor K to the voltage step-down control unit 20.

[Math. 1]

$$\text{Modulation factor } K = 2^{1/2} \times \text{voltage command value}/\text{DC bus voltage Vdc} \quad (1)$$

Figure 3:
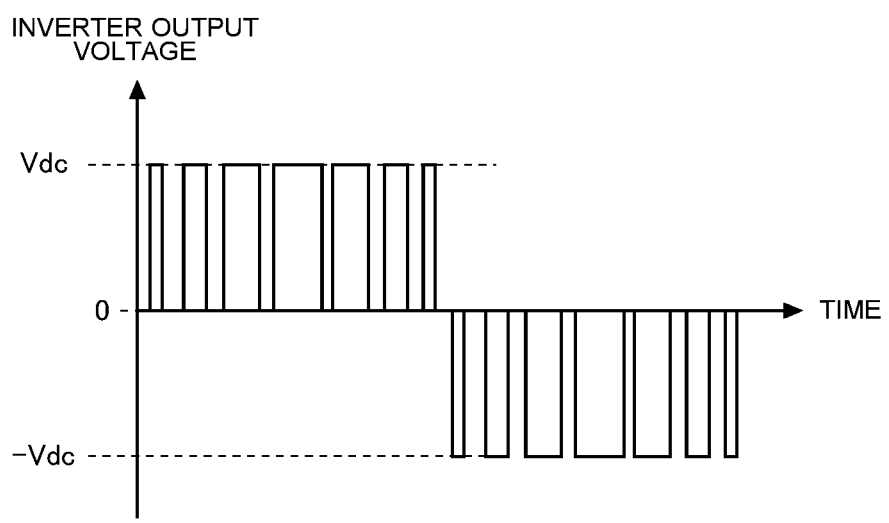
FIG. 3 is an explanatory diagram illustrating an example of the waveform of a voltage output from an inverter circuit in FIG. 1.

FIG. 3 is an explanatory diagram illustrating an example of the waveform of a voltage output from the inverter circuit in FIG. 1. The inverter output voltage is generated by ON and OFF operations of each of the switching elements 12, based on the DC bus voltage Vdc stored in the smoothing capacitor 8, and has a waveform of a pulse voltage, as illustrated in FIG. 3. The peak value of the pulse voltage is equal to the DC bus voltage Vdc. That is, the inverter control unit 21 controls the inverter circuit 11 by PWM control for changing the duration of the ON time of the pulse voltage, so that the magnitude of the voltage to be applied to the motor can be varied equivalently.

In the case of PWM control, as described above, the peak value of the inverter output voltage is equal to the DC bus voltage Vdc. In the case where the rotation speed of the compressor motor 30a is relatively low, a large voltage is not required for driving of the compressor motor 30a. Therefore, the inverter control unit 21 equivalently reduces the voltage to be applied to the compressor motor 30a by narrowing the pulse width.

Figure 4:
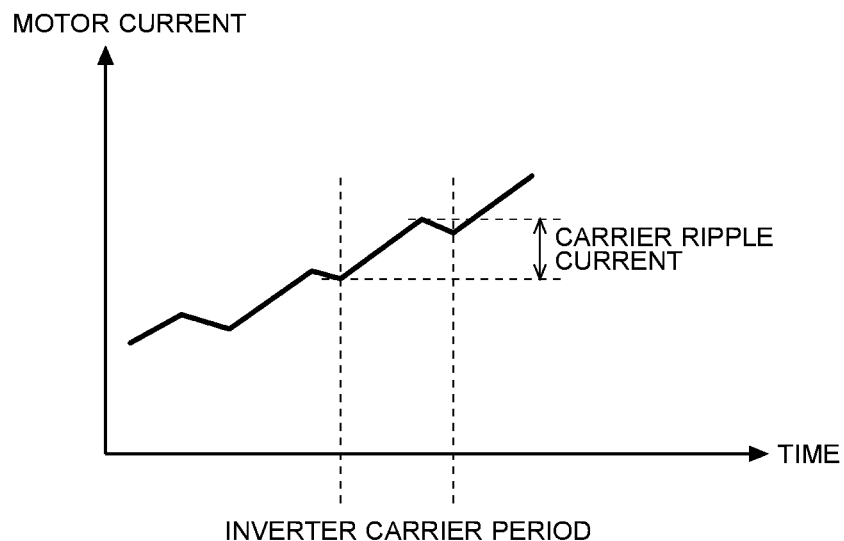
FIG. 4 is a graph illustrating an example of a current flowing in a compressor motor in FIG. 1.

FIG. 4 is a graph illustrating an example of a current flowing in the compressor motor in FIG. 1. In the graph of FIG. 4, the horizontal axis represents time, and the vertical axis represents a motor current, which is a current flowing in the compressor motor 30a. In the case where PWM control is performed, the DC bus voltage Vdc and the motor current in the inverter carrier period have characteristics in which inclination of the motor current increases as the DC bus voltage Vdc increases and inclination of the motor current decreases as the DC bus voltage Vdc decreases.

Therefore, as illustrated in FIG. 4, the variation width of the motor current generated for each inverter carrier period increases in accordance with an increase in the DC bus voltage Vdc and decreases in accordance with a decrease in the DC bus voltage Vdc. The variation width of the motor current generated for each inverter carrier period will be referred to as a "carrier ripple current." A feature of the carrier ripple current of increasing loss such as iron loss of a motor is generally known, and it is required to suppress the increase in loss as much as possible. Thus, the voltage step-down circuit 10 that adjusts the magnitude of the DC bus voltage Vdc is mounted on the power converter 200, and the DC bus voltage Vdc is reduced in an appropriate manner, so that the carrier ripple current can be reduced, thereby a highly efficient operation of the motor being achieved. That is, in Embodiment 1, the voltage step-down circuit 10 performs control such that the DC bus voltage Vdc has a desired magnitude. Thus, operating efficiency of the power converter 200 can be improved.

The voltage step-down control unit 20 calculates the duty ratio α of ON and OFF operations of the voltage step-down switching element 5, based on at least one of the DC bus voltage Vdc detected by the voltage detector 9a and the reactor current IL detected by the current detector 9b. The duty ratio α corresponds to a value obtained by dividing the pulse width by the pulse period and is generally represented by a value from 0 to 1 or a value from 0% to 100%.

The voltage output from the voltage step-down circuit 10 is determined by the duty ratio α, which is calculated by the voltage step-down control unit 20. For example, in the case where the duty ratio α is set to "0.8," a value of 80% of the DC current output from the three-phase rectifier 2 is output from the voltage step-down circuit 10. That is, the relationship of an input voltage Vin and an output voltage Vout of the voltage step-down circuit 10 is represented by Equation (2) mentioned below. The duty ratio α is represented by a value within a range from 0 to 1. Even in the case where the voltage step-down switching element 5 is turned OFF in the state in which current is flowing, a surge voltage is suppressed by operation of the input filter capacitor 4. Therefore, the power converter 200 is able to continue a normal operating state.

[Math. 2]

$$V\text{out} = \alpha \times V\text{in} \quad (2)$$

When the voltage step-down switching element 5 is turned OFF, the reactor 6 supplies energy to the inverter circuit 11 side. The reactor 6 operates such that the amount of change in the current flowing in the reactor 6 decreases. Specifically, when the voltage step-down switching element 5 is turned OFF, the reactor 6 tries to cause a current to flow to the inverter circuit 11 side. Therefore, a loop of a current that flows from an anode side of the backflow prevention element 7, through the cathode side of the backflow prevention element 7, and to the inverter circuit 11 side is formed. In the case where the voltage step-down switching element 5 is in an ON state, the voltage output from the three-phase rectifier 2 is directly supplied to the inverter circuit 11 side.

By causing a charge/discharge current representing by Cdv/dt to flow, the smoothing capacitor 8 smooths pulsation of the voltage generated by a switching operation of the voltage step-down switching element 5 mentioned above. The charge/discharge current represented by Cdv/dt represents a ripple current flowing in the smoothing capacitor 8. Due to operation of the ripple current flowing in the smoothing capacitor 8, the DC bus voltage Vdc input to the inverter circuit 11 has a stable value with a suppressed voltage pulsation.

Figure 5:
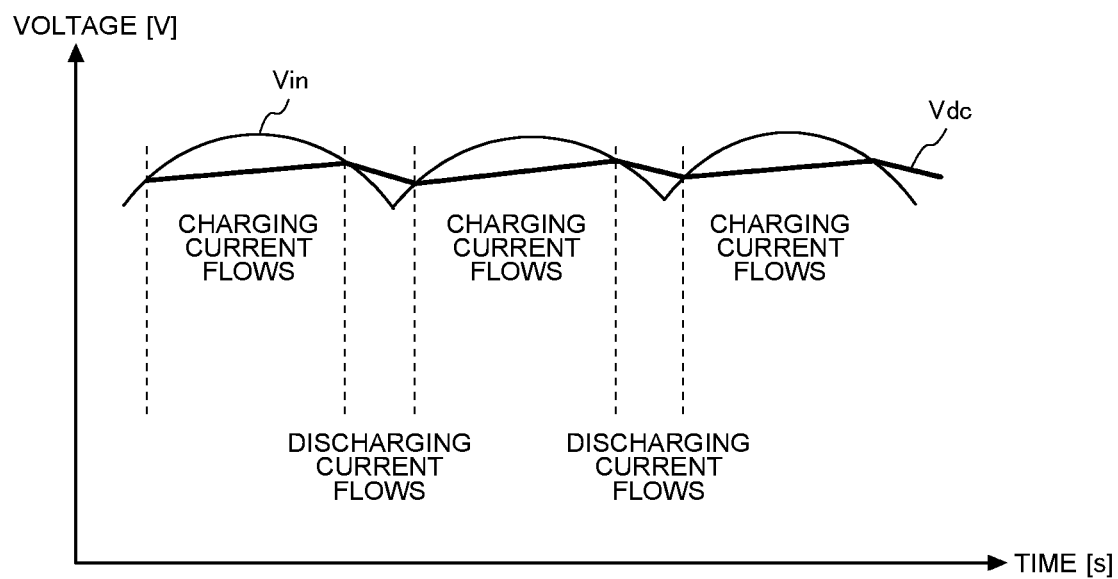
FIG. 5 is a graph illustrating an example of the relationship of an output voltage from a three-phase rectifier and a DC bus voltage in FIG. 1.

FIG. 5 is a graph illustrating an example of the relationship of an output voltage from the three-phase rectifier in FIG. 1 and a DC bus voltage. In the case where the voltage step-down switching element 5 is in the ON state, a combined voltage of the input voltage Vin supplied from the three-phase AC power supply 1 and a voltage VL of the reactor 6 is applied to the smoothing capacitor 8. At this time, if the DC bus voltage Vdc is smaller than the input voltage Vin (relationship of Vdc<Vin is satisfied), a current flows through a path for charging the smoothing capacitor 8.

In contrast, if the DC bus voltage Vdc is larger than the input voltage Vin (relationship of Vdc>Vin is satisfied), energy supplied from the three-phase AC power supply 1 is not used at the inverter circuit 11, but energy stored in the smoothing capacitor 8 is consumed by the inverter circuit 11. At this time, the DC bus voltage Vdc decreases. That is, when the voltage step-down switching element 5 is ON, a state in which the magnitude relationship between the DC bus voltage Vdc and the input voltage Vin is switched periodically continues, and charge and discharge operations of the smoothing capacitor 8 are repeatedly performed. Thus, stable energy can be supplied to the inverter circuit 11 side.

When the voltage step-down switching element 5 is OFF, power supply from the three-phase AC power supply 1 is interrupted. Therefore, as described above, energy stored in the reactor 6 and the smoothing capacitor 8 is supplied to the inverter circuit 11. At this time, the current flowing in the smoothing capacitor 8 always flows not in a charging direction but in a discharging direction. The energy stored in the smoothing capacitor 8 and the energy stored in the reactor 6 are supplied to the inverter circuit 11 in a sharing manner.

In the case of a configuration including a circuit that steps up a DC voltage, such as a one-piece step-up circuit, as in known power converters, when a step-up switching element becomes the ON state, energy is supplied only from a smoothing capacitor to an inverter circuit. Therefore, burden on the smoothing capacitor increases. In contrast, in the power converter 200 including the voltage step-down circuit 10, as described above, energy may be supplied from the smoothing capacitor 8 and the reactor 6 in a sharing manner. Therefore, an effect of reduction of the ripple current flowing in the smoothing capacitor 8 is larger than the configuration including the known step-up circuit.

Figure 6:
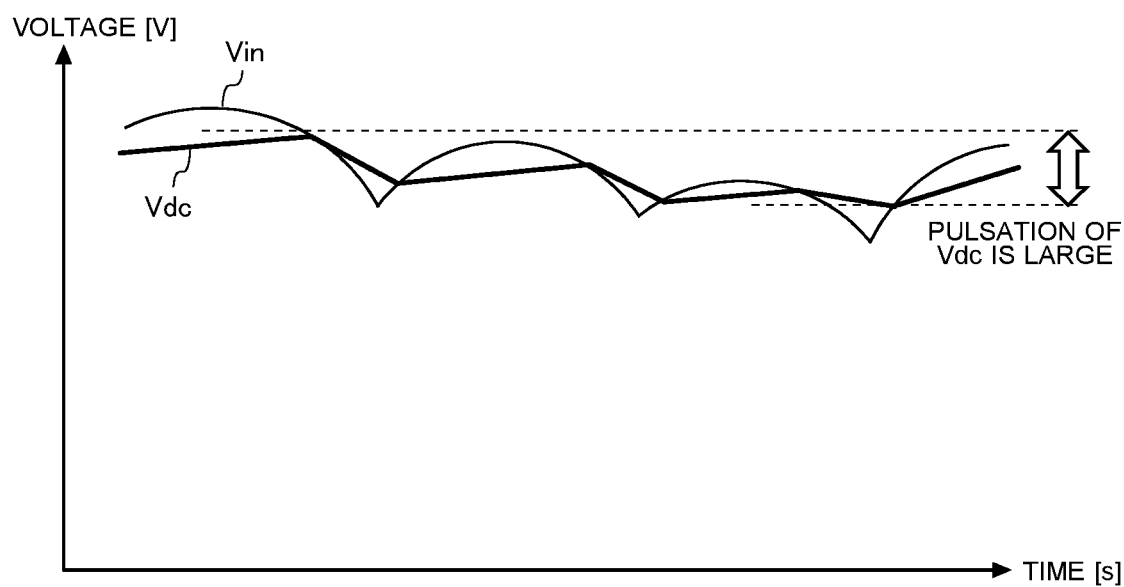
FIG. 6 is an explanatory diagram illustrating a state of a change in a DC bus voltage in the case where voltage imbalance has occurred in a three-phase AC power supply in a power converter according to a comparative example of Embodiment 1 of the present invention.

FIG. 6 is an explanatory diagram illustrating a state of a change in a DC bus voltage in the case where voltage imbalance has occurred in a three-phase AC power supply in a power converter according to a comparative example of Embodiment 1. A case where imbalance of three-phase voltage occurs in a three-phase AC power supply will be described with reference to FIG. 6. Voltage imbalance, that is, imbalance of three-phase voltage, represents a case where line voltages of phases exhibit different values, for example, RS voltage Vrs=200 V, ST voltage Vst=205 V, and TR voltage Vtr=195 V.

It is generally known that, when voltage imbalance occurs, as illustrated in FIG. 6, the input voltage Vin, which is output from the three-phase rectifier, greatly fluctuates, pulsation of the DC bus voltage Vdc also increases in accordance with the fluctuation, and a ripple current flowing in the smoothing capacitor increases consequently. That is, occurrence of voltage imbalance leads to heat generation or shortening of the life span of the smoothing capacitor caused by inflow of excessive current. Moreover, damage or breakage may occur in equipment, and the power converter may fail to operate. Furthermore, currents of phases flowing in the three-phase AC power source supply 1 also become unbalanced, and a current many times that for a phase with the lowest voltage may flow in a phase with a high voltage. In addition, a discontinuous state that includes a period in which a current flowing in the reactor and the switching element is 0 A appears, and there arises a problem in which an increase in the current peak value increases loss. In the case of known power converters, to solve the above-mentioned problem, it is required to select an electrostatic capacitance of the smoothing capacitor based on the assumption of voltage imbalance and to select various components that satisfy current rating. This causes an increase in the cost.

In contrast, in Embodiment 1, a configuration for solving the above-mentioned problem by operating the voltage step-down circuit 10 when voltage imbalance is detected is adopted. That is, in the case where the voltage step-down circuit 10 is operating, the power converter 200 controls the voltage step-down switching element 5 such that a constant DC bus voltage Vdc and a constant reactor current IL can be obtained. Thus, the above-mentioned problem caused by voltage imbalance is solved, and the ripple current flowing in the smoothing capacitor 8 decreases. Furthermore, the reactor current IL is controlled to be constant. Therefore, currents of phases of the three-phase AC power supply 1 are not unbalanced, and balanced current flowing among three phases can be achieved.

Here, the power converter 200 determines, with the imbalance determining unit 22, whether or not voltage imbalance has occurred in the three-phase AC power supply 1, and controls, with the voltage step-down control unit 20, the voltage step-down switching element 5. Therefore, these configurations will be specifically explained below.

The imbalance determining unit 22 determines, based on the state of the voltage step-down circuit 10, whether or not voltage imbalance has occurred in the three-phase AC power supply 1. In the case where voltage imbalance has occurred, if the voltage step-down circuit 10 is in a stopped state, the pulsation width ΔV of the DC bus voltage Vdc increases. Therefore, the imbalance determining unit 22 uses, as information indicating the state of the voltage step-down circuit 10, the DC bus voltage Vdc detected by the voltage detector 9a.

That is, the imbalance determining unit 22 chronologically acquires the DC bus voltage Vdc from the voltage detector 9a via the detecting unit 9, and determines, according to fluctuations of the acquired DC bus voltage Vdc, whether or not voltage imbalance has occurred. More specifically, the imbalance determining unit 22 acquires the DC bus voltage Vdc during an acquisition period, and stores the maximum value and the minimum value of the DC bus voltage Vdc in the acquisition period into an internal memory or other units. The imbalance determining unit 22 obtains a difference between the maximum value and the minimum value as a pulsation width ΔV. The acquisition period is set within a range, for example, from several ten milliseconds to several hundred milliseconds.

Furthermore, the imbalance determining unit 22 compares the pulsation width ΔV with a preset voltage determination threshold, and determines whether or not the pulsation width ΔV is larger than the voltage determination threshold. The voltage determination threshold is set in advance for detection of voltage imbalance by a test with a real machine or other procedures, and is stored in an internal memory or other units. In the case where the pulsation width ΔV is larger than the voltage determination threshold, the imbalance determining unit 22 may determine that voltage imbalance has occurred in the three-phase AC power supply 1. Therefore, the imbalance determining unit 22 outputs an operation instruction signal indicating an instruction to operate the voltage step-down circuit 10 to the voltage step-down control unit 20.

In the case where the imbalance determining unit 22 determines that voltage imbalance has occurred, the voltage step-down control unit 20 performs switching of the voltage step-down switching element 5. That is, in accordance with an operation instruction signal from the imbalance determining unit 22, the voltage step-down control unit 20 performs switching of the voltage step-down switching element 5 to operate the voltage step-down circuit 10. In the case where the voltage step-down control unit 20 has already performed switching of the voltage step-down switching element 5, the voltage step-down control unit 20 causes the voltage step-down switching element 5 to continue ON and OFF operations.

In the case where the imbalance determining unit 22 determines that voltage imbalance has occurred, if the voltage step-down circuit 10 has already started operation, the DC bus voltage Vdc is controlled to be constant ($\Delta V \approx 0$). Therefore, it is desirable that the imbalance determining unit 22 monitor the operating state of the voltage step-down control unit 20 or the voltage step-down circuit 10, so that the determination as to whether or not voltage imbalance has occurred can be performed only in the state in which the voltage step-down circuit 10 is not operating.

Figure 7:
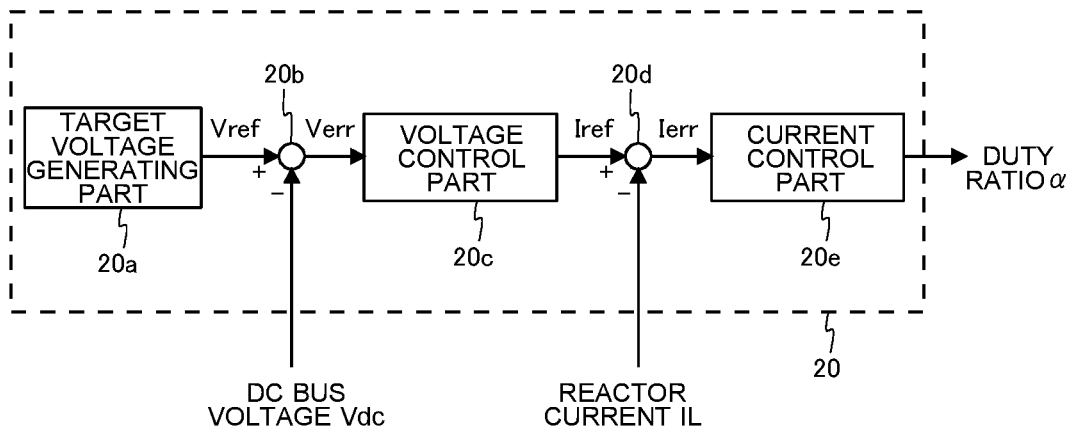
FIG. 7 is a block diagram illustrating an example of the functional configuration of a voltage step-down control unit in FIG. 1.

FIG. 7 is a block diagram illustrating an example of the functional configuration of the step-up control unit in FIG. 1. A functional configuration of the voltage step-down control unit 20 will be specifically explained with reference to FIG. 7.

The voltage step-down control unit 20 includes a target voltage generating unit 20a, a first subtracting unit 20b, a voltage control unit 20c, a second subtracting unit 20d, and a current control unit 20e. The voltage step-down control unit 20 performs feedback control such that the DC bus voltage Vdc detected by the voltage detector 9a reaches a target command voltage Vref generated by the target voltage generating unit 20a. That is, the target voltage generating unit 20a generates the target command voltage Vref, which serves as an attainment target voltage value for the DC bus voltage Vdc, in accordance with output to the inverter circuit 11, and outputs the generated target command voltage Vref to the first subtracting unit 20b. Information corresponding to output to the inverter circuit 11 is assumed to be the rotation speed of the motor, the modulation factor K, or other parameters.

The first subtracting unit 20b is configured to receive the DC bus voltage Vdc from the voltage detector 9a. The first subtracting unit 20b subtracts the DC bus voltage Vdc from the target command voltage Vref generated by the target voltage generating unit 20a and thus obtains a voltage deviation amount Verr. The voltage control unit 20c multiplies the voltage deviation amount Verr obtained by the first subtracting unit 20b by a preset gain to obtain a control amount Iref, and outputs the obtained control amount Iref to the second subtracting unit 20d.

The second subtracting unit 20d is configured to receive the reactor current IL from the current detector 9b. The second subtracting unit 20d subtracts the reactor current IL from the control amount Iref obtained by the voltage control unit 20c and thus obtains a current deviation amount Irr. The current control unit 20e multiplies the current deviation amount Irr obtained by the second subtracting unit 20d by a preset gain to obtain a duty ratio $\alpha$, and outputs the obtained duty ratio $\alpha$ as a control amount. That is, the current control unit 20e controls ON and OFF operations of the voltage step-down switching element 5, based on the duty ratio $\alpha$.

The processing details of the voltage control unit 20c are not limited to the explanation provided above. For example, by adding a value obtained by temporally integrating the voltage deviation amount Verr to the control amount Iref obtained by multiplying the voltage deviation amount Verr by a gain, the voltage control unit 20c may operate such that a steady deviation becomes 0, and may output the control amount Iref. The operation for causing the steady deviation to be 0 represents an operation for causing the DC bus voltage Vdc to be equal to the target command voltage Vref. Furthermore, the processing details of the current control unit 20e are not limited to the explanation provided above. For example, by adding a value obtained by temporally integrating a current deviation amount Ierr to the duty ratio $\alpha$ obtained by multiplying the current deviation amount Irr by a gain, the current control unit 20e may operate such that the steady deviation becomes 0. The operation for causing the steady deviation to be 0 represents an operation for causing the reactor current Ir to be equal to the control amount Iref.

As described above, the voltage step-down control unit 20 performs feedback control based on the DC bus voltage Vdc in a major loop, and performs feedback control based on the reactor current IL in a minor loop, which is inside the major loop. With the control configuration described above, the voltage step-down control unit 20 is finally able to calculate the duty ratio $\alpha$ of the voltage step-down switching element 5. In the case where the configuration in Embodiment 1 is adopted, the reactor current IL is controlled to be constant, and stability to disturbance or other trouble is high. Therefore, robustness at the time of controlling the voltage step-down circuit 10 can be improved.

The voltage step-down control unit 20 may be configured to perform feedback control to a desired value by detecting only the DC bus voltage Vd, without detecting the reactor current IL, and thus calculate the duty ratio $\alpha$ of the voltage step-down switching element 5. That is, the voltage step-down control unit 20 may output, as the duty ratio $\alpha$, a value obtained by the voltage control unit 20c multiplying the voltage deviation amount Verr by a gain. Thus, the second subtracting unit 20d and the current control unit 20e, as well as the current detector 9b that detects the reactor current IL, are unnecessary, and the voltage step-down control unit 20 may be configured as a more inexpensive circuit.

Figure 8:
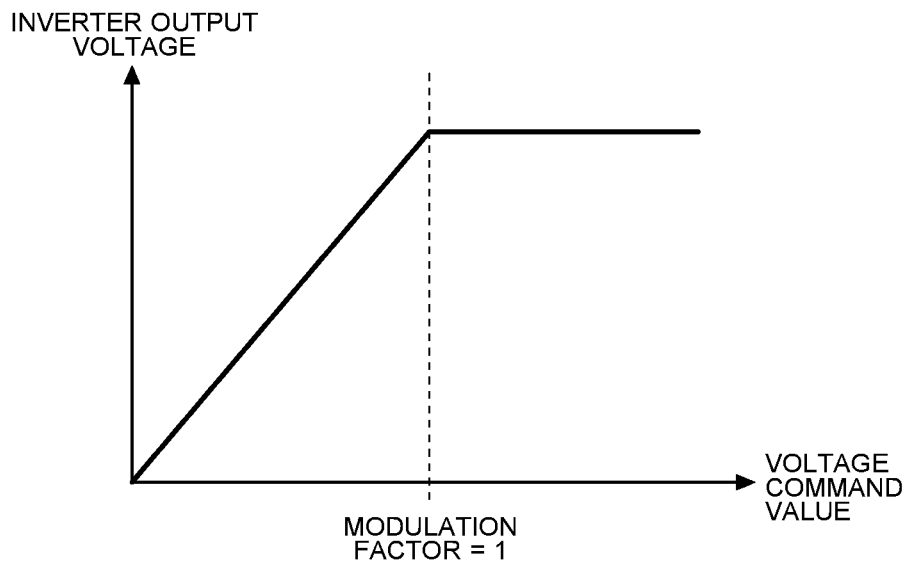
FIG. 8 is a graph illustrating an example of the relationship of an inverter output voltage output from the inverter circuit and a voltage command value calculated by an inverter control unit in FIG. 1.

FIG. 8 is a graph illustrating an example of the relationship of an inverter output voltage output from the inverter circuit and a voltage command value calculated by the inverter control unit in FIG. 1. As described above, regarding the inverter output voltage applied to the motor, as the peak value increases, the carrier ripple current increases and iron loss of the motor also increases. Therefore, the voltage step-down control unit 20 does not apply a voltage of greater than a minimum necessary level to the inverter circuit 11. The voltage step-down control unit 20 in Embodiment 1 determines, by using a parameter such as the modulation factor K calculated at the inverter control unit 21, whether or not the voltage is within the minimum necessary level.

The modulation factor K obtained by the inverter control unit 21 is a parameter indicating what percentage of voltage in the DC bus voltage Vdc is output from the inverter circuit 11, as represented by Equation (1) mentioned above. For example, when the modulation factor K is less than 1 (modulation factor K<1), the peak value of a fundamental AC component of the inverter output voltage is controlled at a value smaller than the DC bus voltage Vdc. It is indicated that, as the modulation factor K decreases, a voltage required for the motor decreases, and the carrier ripple current increases. Furthermore, when the modulation factor K is greater than 1 (modulation factor K>1), a value equal to or greater than the DC bus voltage Vdc is required for the AC peak value of the inverter output voltage. As illustrated in FIG. 8, in actuality, in the region where the modulation factor K is greater than 1, the value of the inverter output voltage is saturated. Therefore, a voltage of greater than this value cannot be output.

The target voltage generating unit 20a controls the target command voltage Vref such that, for example, the modulation factor K obtained by the inverter control unit 21 is always 1. Thus, the minimum necessary voltage is always applied to the motor. Therefore, the carrier ripple current can be reduced, and iron loss can be suppressed. As a result, iron loss in the operation of the motor can be suppressed, and the motor can be controlled more efficiently, as the power converter.

More specifically, in the case where the modulation factor K is greater than 1, the inverter output voltage is in the saturated state. Therefore, the target voltage generating unit 20a increases the target command voltage Vref. In contrast, in the case where the modulation factor K is less than 1, it may be determined that the inverter output voltage is sufficient. Therefore, the target voltage generating unit 20a reduces the target command voltage Vref. When the modulation factor K is 1, the target voltage generating unit 20a maintains the current target command voltage Vref.

In the case where the modulation factor K is not 1, the voltage step-down control unit 20 may vary the target command voltage Vref by a predetermined set value or may set the change amount of the target command voltage Vref according to the value of the modulation factor K. In the latter case, a change amount table in which the modulation factor K and the change amount of the target command voltage Vref are associated with each other may be stored in an internal memory or other units. The target voltage generating unit 20a may refer to the modulation factor K in the change amount table to obtain the change amount of the target command voltage Vref. The change amount table may be configured such that the change amount of the target command voltage Vref increases as the difference between the modulation factor K and 1 increases.

Figure 9:
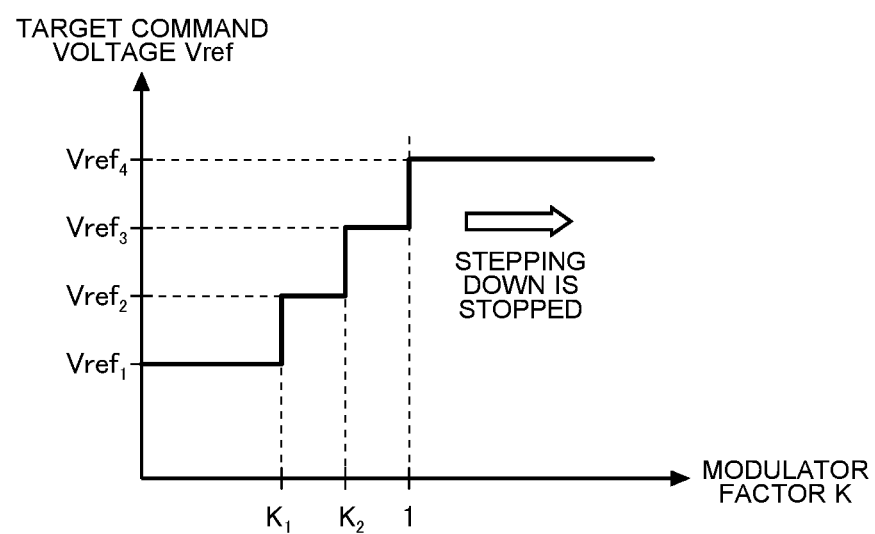
FIG. 9 is an explanatory diagram illustrating an example of a process of a target voltage generating unit in FIG. 7 for generating a target command voltage.

FIG. 9 is an explanatory diagram illustrating an example of a process of the target voltage generating unit in FIG. 7 for generating a target command voltage. In FIG. 9, the horizontal axis represents the modulation factor K, and the vertical axis represents the target command voltage Vref. That is, command voltage derivation information that defines the target command voltage Vref in stages for a plurality of ranges of the modulation factor K may be stored in an internal memory or other units. The target voltage generating unit 20a may refer to the command voltage derivation information to set the target command voltage Vref in accordance with the modulation factor K.

In FIG. 9, a range from 0 inclusive to less than $K_1$, a range from $K_1$ inclusive to less than $K_2$, a range from $K_2$ inclusive to less than 1, and a range of 1 or more are illustrated as examples of the range of the modulation factor K. Here, $K_1$ and $K_2$ have the relationship of $0<K_1<K_2<1$. In FIG. 8, a target command voltage $Vref_1$ is associated with the range from 0 inclusive to less than $K_1$, a target command voltage $Vref_2$ is associated with the range from $K_1$ inclusive to less than $K_2$, and a target command voltage $Vref_3$ is associated with the range from $K_2$ inclusive to less than 1. Furthermore, in FIG. 8, a target command voltage $Vref_4$ is associated with the range of 1 or more. Although the case where the target command voltage Vref is set in four stages is illustrated in FIG. 8, the target command voltage Vref is not necessarily set as described above. For the command voltage derivation information, the target command voltage Vref of three or less stages or five or more stages may be set according to the range of the modulation factor K.

In the explanation provided above, the case where the target voltage generating unit 20a adjusts the value of the target command voltage Vref in accordance with a change in the modulation factor K is illustrated. However, adjustment of the target command voltage Vref is not limited to the example described above. The target voltage generating unit 20a may adjust the value of the target command voltage Vref in accordance with a change in the rotation speed of the compressor motor 30a. In any of the techniques mentioned above, efficiency deteriorates by switching loss generated at the time of ON and OFF operations of the voltage step-down switching element 5. Therefore, taking into consideration both iron loss of the motor and switching loss, the power converter 200 steps down the DC bus voltage Vdc to achieve high efficiency of the entire device.

In the case where an increase in the rotation speed of the motor makes it necessary to increase the voltage to be applied to the motor, the voltage step-down circuit 10 does not need to be operated. Therefore, the voltage step-down control unit 20 stops the operation of the voltage step-down switching element 5. That is, as is clear from Equation (2), by setting the duty ratio α of the voltage step-down switching element 5 to 1 and causing the voltage step-down switching element 5 to be always in the ON state, a normal DC voltage obtained by the three-phase rectifier 2 is supplied to the inverter circuit 11, so that the motor can operate.

In the case where voltage imbalance has occurred, even in a region where the rotation speed of the motor is high, the power converter 200 according to Embodiment 1 preferentially operates the voltage step-down circuit 10 to reduce the ripple current to the smoothing capacitor 8. The region where the rotation speed of the motor is high represents a region where the modulation factor K is greater than 1, and hereinafter, will be referred to as an overmodulation region. However, if the voltage step-down circuit 10 operates in the overmodulation region, the DC bus voltage Vdc decreases, and the inverter output voltage decreases at the same time. Therefore, if the voltage step-down circuit 10 is operated in the case where voltage imbalance has occurred, the operating range of the motor may be narrowed. In this respect, in Embodiment 1, a technique for not affecting the operating range of the motor and reducing the ripple current in the smoothing capacitor 8 is adopted, as described below.

As described above, the voltage step-down control unit 20 calculates the voltage deviation amount Verr, which is the difference between the target command voltage Vref obtained by the target voltage generating unit 20a and the DC bus voltage Vdc, which is the voltage across the smoothing capacitor 8. For example, in the case where voltage imbalance has occurred, when the DC bus voltage Vdc pulsates and the relationship of Vref<Vdc (Verr<0) is satisfied, the DC bus voltage Vdc needs to be stepped down. Therefore, the voltage step-down control unit 20 calculates the duty ratio α. The voltage step-down control unit 20 performs switching of the voltage step-down switching element 5, based on the calculated duty ratio α. As a result, the DC bus voltage Vdc is stepped down. Furthermore, when the relationship of Vref>Vdc (Verr>0) is satisfied, stepping down does not need to be performed. Therefore, the voltage step-down control unit 20 performs control in the direction of increasing the duty ratio α, that is, in the direction of decreasing the number of switching times of the voltage step-down switching element 5.

Figure 10:
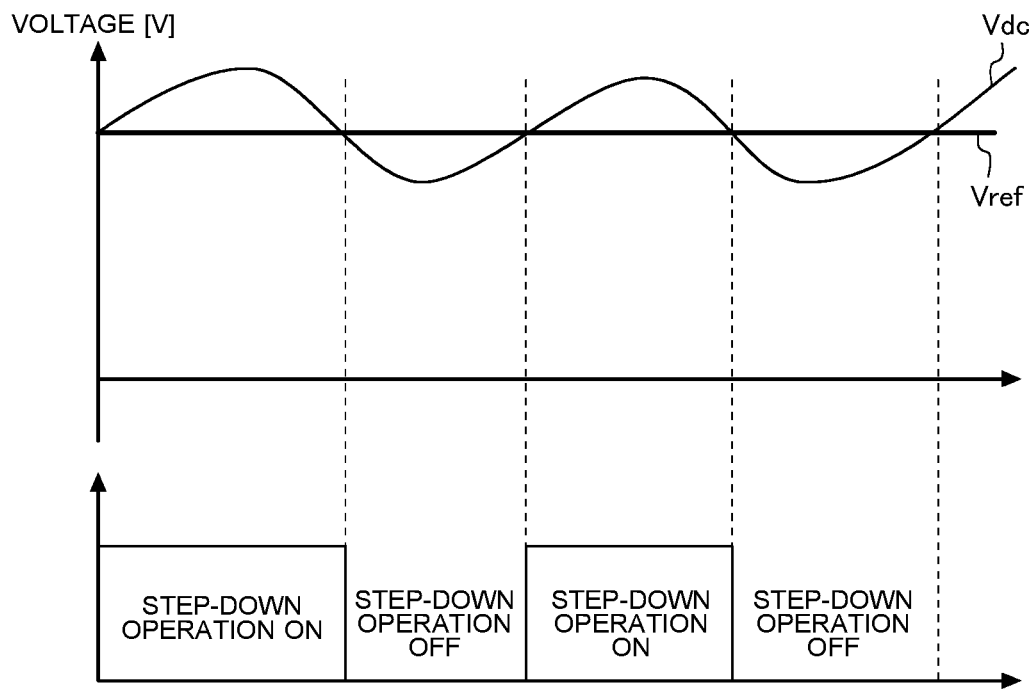
FIG. 10 is a time chart illustrating the relationship of a DC bus voltage, a target command voltage, and a timing at which a voltage step-down circuit operates in the power converter in FIG. 1.

FIG. 10 is a time chart illustrating the relationship of the DC bus voltage, the target command voltage, and the timing at which the voltage step-down circuit operates in the power converter in FIG. 1. In FIG. 10, the relationship of a change in the magnitude relationship of the target command voltage Vref and the DC bus voltage Vdc and the timing at which the voltage step-down circuit 10 operates is illustrated. In FIG. 10, the state in which the voltage step-down switching element 5 is ON is represented by "step-down operation ON", and the state in which the voltage step-down switching element 5 is OFF is represented by "step-down operation OFF". The same applies to drawings that will be explained later. That is, the operating state of the voltage step-down circuit 10 is determined by the magnitude relationship of the target command voltage Vref generated by the target voltage generating unit 20a and the DC bus voltage Vdc.

Regarding the ripple current flowing to the smoothing capacitor 8, the ripple current flowing to the smoothing capacitor 8 can be reduced during a period in which the voltage step-down switching element 5 is ON, which is equivalent to the state in which the voltage step-down circuit 10 is operating. That is, only during the period in which the voltage step-down circuit 10 is operating, the ripple current flowing to the smoothing capacitor 8 can be reduced.

Figure 11:
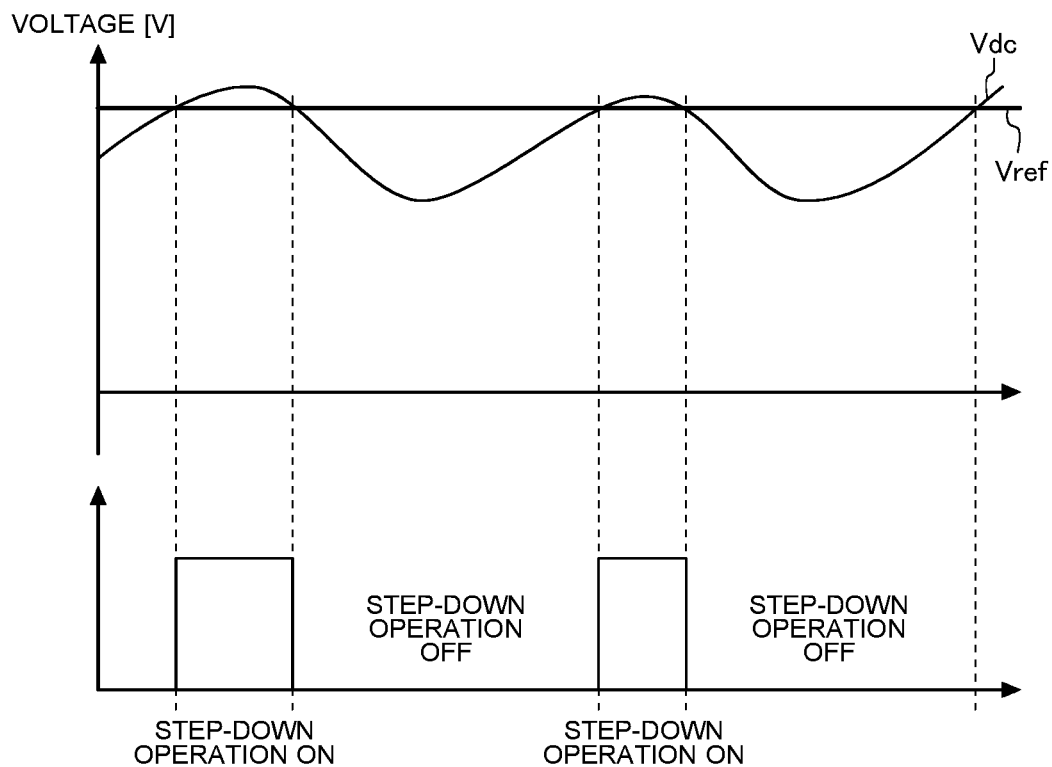
FIG. 11 is a time chart illustrating the relationship of the DC bus voltage, the target command voltage, and the timing at which the voltage step-down circuit operates in the power converter in FIG. 1 in the case where the target command voltage is increased.
Figure 12:
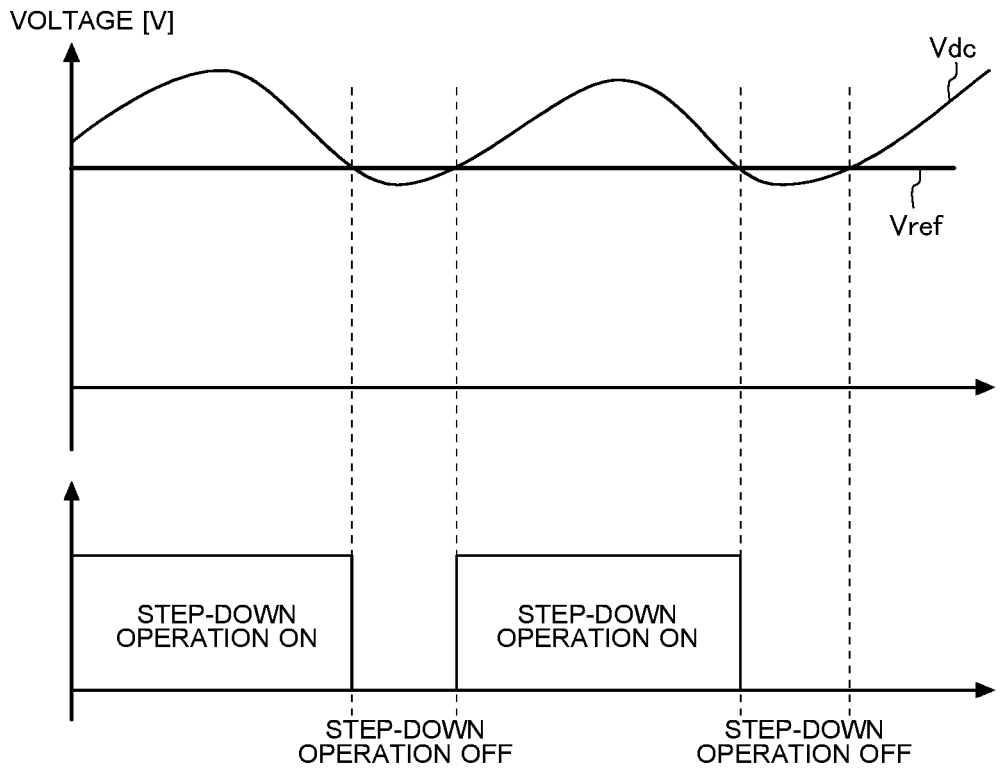
FIG. 12 is a time chart illustrating the relationship of the DC bus voltage, the target command voltage, and the timing at which the voltage step-down circuit operates in the power converter in FIG. 1 in the case where the target command voltage is increased.

FIG. 11 is a time chart illustrating the relationship of the DC bus voltage, the target command voltage, and the timing at which the voltage step-down circuit operates in the power converter in FIG. 1 in the case where the target command voltage is increased. FIG. 12 is a time chart illustrating the relationship of the DC bus voltage, the target command voltage, and the timing at which the voltage step-down circuit operates in the power converter in FIG. 1 in the case where the target command voltage is increased.

As illustrated in FIG. 11, in the case where the target command voltage Vref is larger than the DC bus voltage Vdc, the larger the difference between the target command voltage Vref and the DC bus voltage Vdc, the shorter the period during which the voltage step-down circuit 10 is operated by the ON and OFF operations of the voltage step-down switching element 5, and a reduction effect of the ripple current flowing to the smoothing capacitor 8 thus decreases. In contrast, as illustrated in FIG. 12, in the case where the target command voltage Vref is smaller than the DC bus voltage Vdc, the smaller the difference between the target command voltage Vref and the DC bus voltage Vdc, the longer the period during which the voltage step-down circuit 10 is operated is longer, and a reduction effect of the ripple current flowing to the smoothing capacitor 8 thus increases.

However, in the overmodulation region where the modulation factor K is greater than 1, the output voltage is already saturated. Therefore, if the voltage step-down circuit 10 is operated so that the DC bus voltage Vdc is reduced, the operating range of the compressor motor 30a is restricted. Thus, in Embodiment 1, in a region in which the value of voltage is equal to or greater than an effective component of a voltage applied to the compressor motor 30a by the inverter circuit 11, the target command voltage Vref is generated while non-contribution as energy to be provided to the compressor motor 30a being paid attention to.

Figure 13:
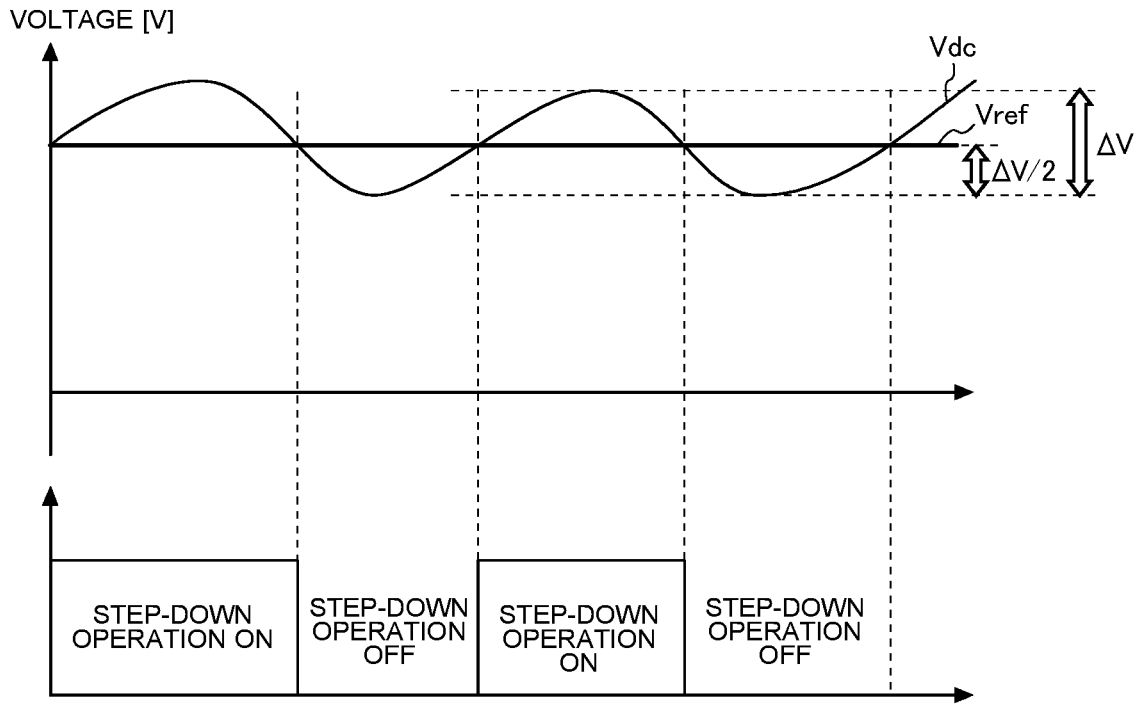
FIG. 13 is a time chart illustrating the relationship of the DC bus voltage, the target command voltage, and the timing at which the voltage step-down circuit operates in the power converter in FIG. 1 in the case where the target command voltage is set to the center value of a pulsating voltage.

FIG. 13 is a time chart illustrating the relationship of the DC bus voltage, the target command voltage, and the timing at which the voltage step-down circuit operates in the power converter in FIG. 1 in the case where the target command voltage is set to the center value of the pulsating voltage. In Embodiment 1, in the region in which the value of voltage is equal to or greater than an effective component of the voltage applied to the compressor motor 30a by the inverter circuit 11 corresponds to a region where the value of voltage is equal to or greater than the average value of the DC bus voltage Vdc (center value $\Delta V/2$ of the pulsation width $\Delta V$).

In Embodiment 1, as illustrated in FIG. 13, a step-down operation of the voltage step-down circuit 10 is performed by setting the target command voltage Vref to the center value of the pulsation width $\Delta V$ of the DC bus voltage Vdc. That is, in the case where the modulation factor K is greater than 1, the target voltage generating unit 20a sets the target command voltage Vref to the center value of the pulsation width $\Delta V$ of the DC bus voltage Vdc in the state in which the voltage step-down circuit 10 is stopped. Thus, the inverter circuit 11 is able to output voltage without affecting the operating range of the motor and is able to protect the smoothing capacitor 8. Furthermore, a pulsation component caused by voltage imbalance is not superimposed on the voltage output from the inverter circuit 11. Therefore, stability of operation of the motor can be improved.

As described above, in the power converter 200 according to Embodiment 1, switching of the voltage step-down switching element 5 in the voltage step-down circuit 10 is performed in the case where voltage imbalance has occurred in the three-phase AC power supply 1. Therefore, an increase in the ripple current and a temperature increase of the smoothing capacitor 8 can be suppressed. Therefore, shortening of the life span of the smoothing capacitor 8 and an increase in the iron loss of the motor can be suppressed, and a stable operation can be achieved. Furthermore, in the power converter 200, by switching the voltage step-down switching element 5 at the time when voltage imbalance occurs, the DC bus voltage Vdc can be stabilized. In the case where voltage imbalance is detected, the power converter 200 causes the voltage step-down circuit 10 to control the DC bus voltage Vdc within a range in which no influence is exerted on the operation of the motor, and the ripple current flowing to the smoothing capacitor 8 can thus be suppressed. Therefore, miniaturization and cost reduction of the smoothing capacitor 8 can be achieved.

Furthermore, the voltage step-down control unit 20 calculates the duty ratio $\alpha$, based on at least one of the DC bus voltage Vdc and the reactor current IL. Therefore, a step-down operation by the voltage step-down circuit 10 can be performed accurately. When voltage imbalance occurs, if the voltage step-down circuit 10 is not operating, the pulsation width $\Delta V$ of the DC bus voltage Vdc increase. In this respect, in the case where the pulsation width $\Delta V$ during the acquisition period for the DC bus voltage Vdc is larger than the voltage determination threshold, the imbalance determining unit 22 detects voltage imbalance in the three-phase AC power supply 1. Therefore, an accuracy of detection of voltage imbalance can be increased.

Furthermore, the voltage step-down control unit 20 generates the target command voltage Vref in accordance with output to the inverter circuit 11. Therefore, the voltage step-down control unit 20 is able to perform control such that the DC bus voltage Vdc detected by the voltage detector 9a is equal to the DC bus voltage Vdc. The target voltage generating unit 20a includes a function for adjusting the value of the target command voltage Vref in accordance with a change in the modulation factor K, which indicates the proportion of the output voltage from the inverter circuit 11 in the DC bus voltage Vdc. Therefore, flexible feedback control can be achieved taking into consideration the balance between the inverter circuit 11 and the DC bus voltage Vdc. In addition, the target voltage generating unit 20a includes a function for setting the target command voltage Vref to the average value of the pulsation width $\Delta V$ of the DC bus voltage Vdc in the state in which the voltage step-down circuit 10 is stopped in the case where the modulation factor K is greater than 1. Therefore, restriction on the operating range of the motor can be moderated. With the use of a relay that performs switching partially for a power supply period for at least one of the voltage step-down switching element 5 and the backflow prevention element 7, a reduction in the cost can be achieved.

Embodiment 2

Figure 14:
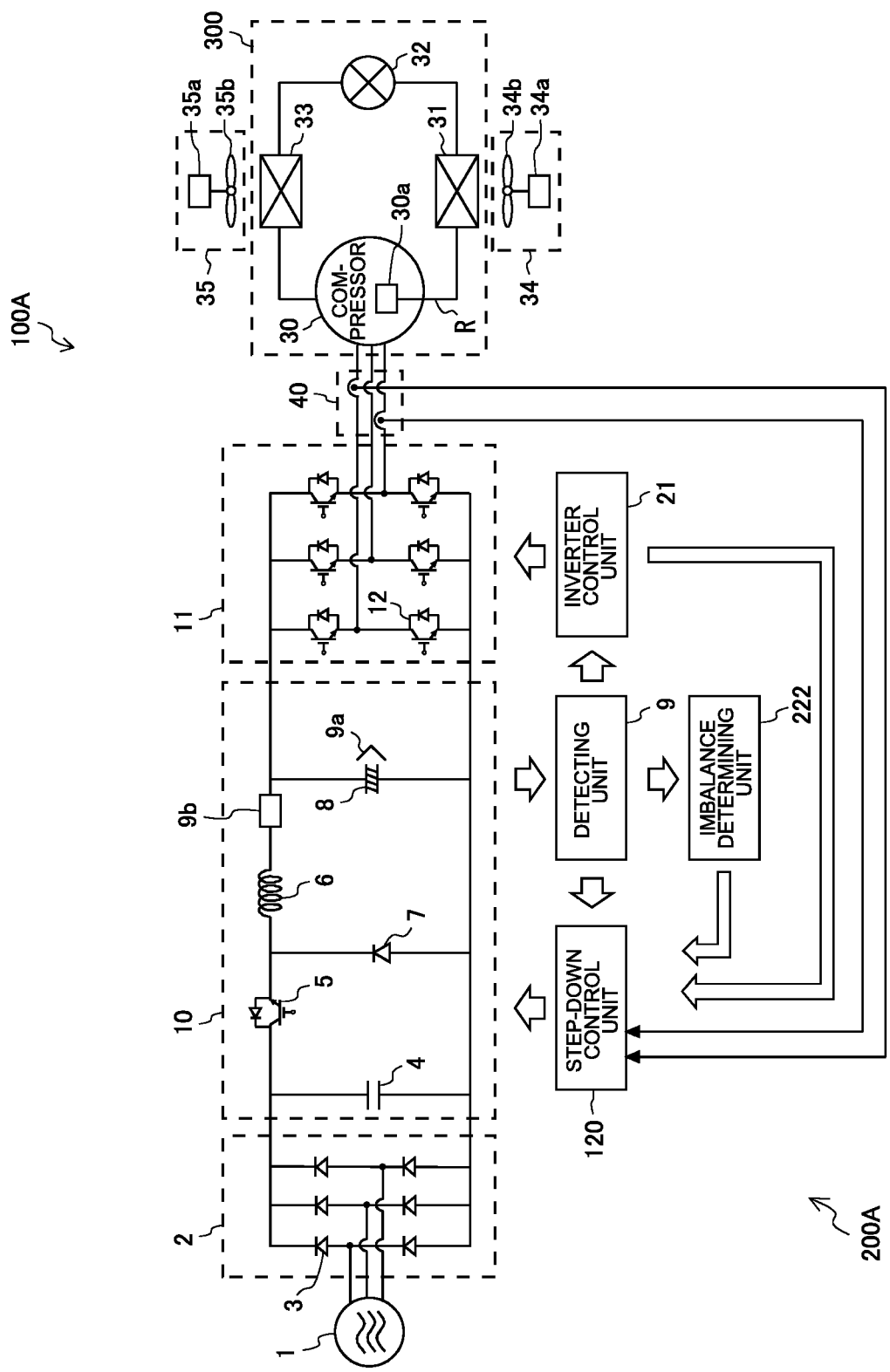
FIG. 14 is a schematic diagram illustrating a configuration of an air-conditioning apparatus that includes a power converter according to Embodiment 2 of the present invention.
Figure 15:
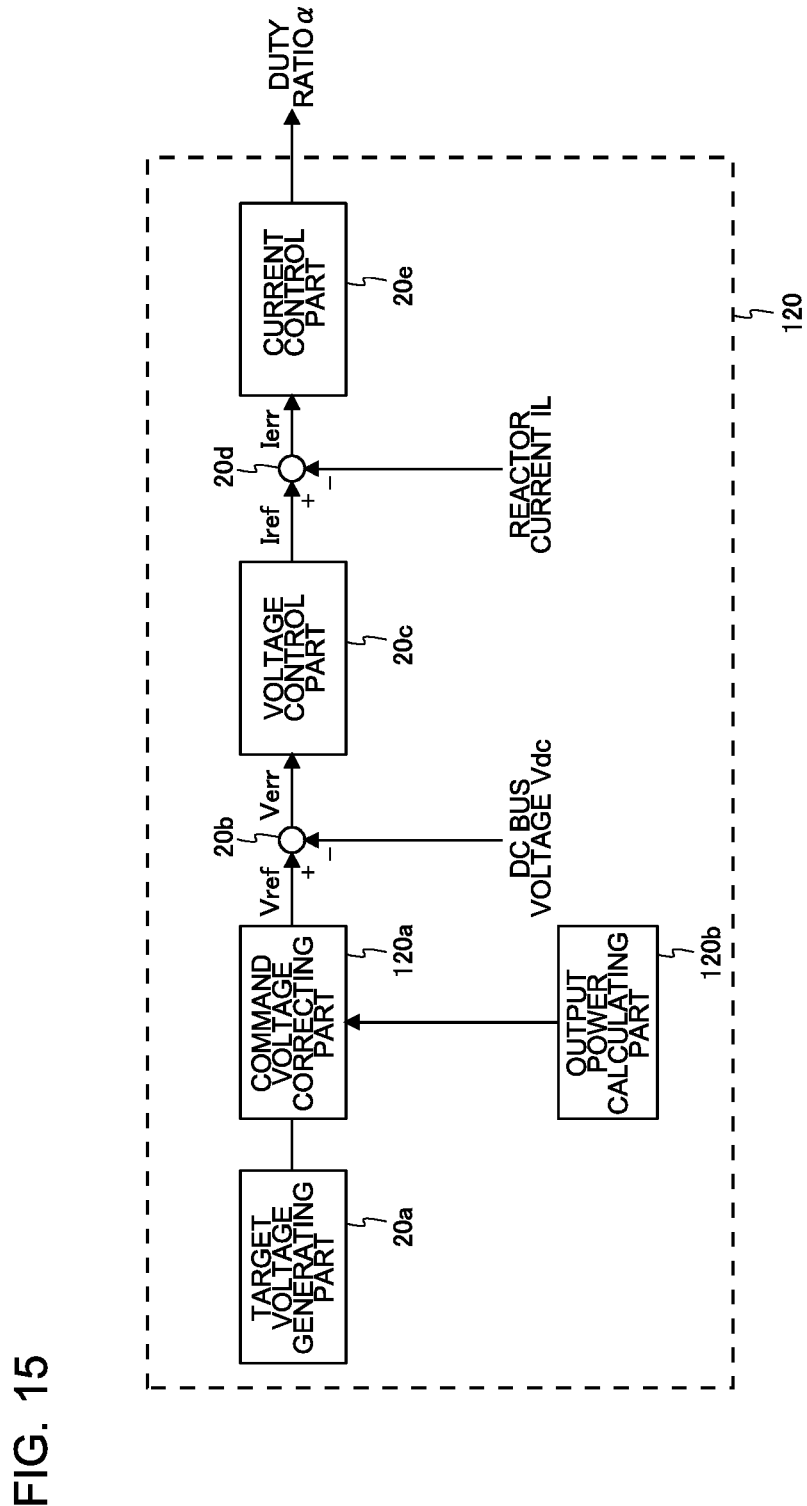
FIG. 15 is a block diagram illustrating an example of the functional configuration of a voltage step-down control unit in FIG. 14.

FIG. 14 is a schematic diagram illustrating a configuration of an air-conditioning apparatus that includes a power converter according to Embodiment 2 of the present invention. FIG. 15 is a block diagram illustrating an example of the functional configuration of a voltage step-down control unit in FIG. 14. The entire configuration of an air-conditioning apparatus 100A according to Embodiment 2 is similar to the air-conditioning apparatus 100 according to Embodiment 1 described above. Therefore, equivalent configurations will be referred to with the same signs, and explanation for those equivalent configurations will be omitted.

As illustrated in FIG. 14, the air-conditioning apparatus 100A includes a current detection unit 40 that detects current flowing to the compressor motor 30a. A power converter 200A includes a voltage step-down control unit 120 that includes a function for correcting the target command voltage Vref, in addition to the function of the voltage step-down control unit 20 in Embodiment 1. As illustrated in FIG. 15, the voltage step-down control unit 120 includes a command voltage correcting unit 120a for correcting the target command voltage Vref and an output power calculating unit 120b for calculating the output power P, which is power output to the inverter circuit 11. The output power P corresponds to the load of the motor. The other configurations of the power converter 200A are similar to those of the power converter 200 according to Embodiment 1.

The voltage step-down control unit 20 in Embodiment 1 performs control such that the target command voltage Vref to be used for control of the voltage step-down circuit 10 is set to the average value of the DC bus voltage Vdc and the target command voltage Vref thus does not affect the operating range of the motor. However, for example, when the output power P increases, the ripple current in the smoothing capacitor 8 tends to increase.

Figure 16:
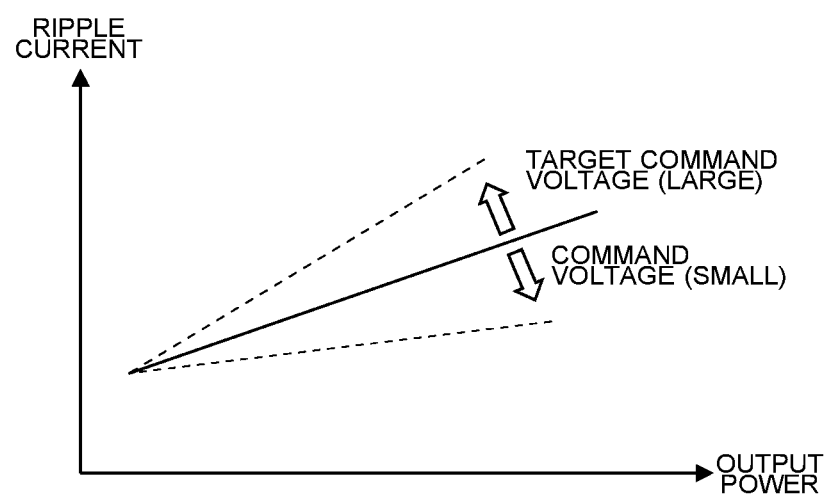
FIG. 16 is a graph illustrating the relationship of output power and a ripple current flowing in a smoothing capacitor in the power converter in FIG. 14.

FIG. 16 is a graph illustrating the relationship of the output power and the ripple current flowing to the smoothing capacitor in the power converter in FIG. 14. In FIG. 16, the relationship of the output power P and the ripple current in the state in which the voltage step-down circuit 10 is operating. As illustrated in FIG. 16, when the target command voltage Vref increases, the inclination of the graph indicating the relationship of the output power P and the ripple current increases. In contrast, when the target command voltage Vref decreases, the inclination of the graph indicating the relationship of the output power P and the ripple current decreases. That is, by varying the target command voltage Vref, the ripple current in the smoothing capacitor 8 with respect to the same inverter output power can be varied.

By increasing the target command voltage Vref, the period during which a step-down operation is being performed, that is, the period during which the voltage step-down switching element 5 is ON, is relatively shortened, as in the example of FIG. 11. Therefore, the voltage applied to the smoothing capacitor 8 greatly fluctuates, and the ripple current increases. In contrast, by reducing the target command voltage, the period during which a step-down operation is being performed is relatively extended, as in the example of FIG. 12. Therefore, the variation width of the voltage applied to the smoothing capacitor 8 decreases, and the ripple current is thus reduced.

In Embodiment 2, in terms of protection of the smoothing capacitor 8 in a situation in which the ripple current increases due to an increase in the output power P, a configuration for correcting the target command voltage Vref in accordance with the output power P is adopted. More specifically, the output power calculating unit 120b calculates the output power P using a inverter output voltage V and an output current I from the inverter circuit 11, according to Equation (3) mentioned below. Then, the output power calculating unit 120b outputs the calculated output power P to the command voltage correcting unit 120a.

[Math. 3]

$$\text{Output power } P = 3^{1/2} \times V \times I \times \cos\theta \quad (3)$$

The output power calculating unit 120b acquires, as the inverter output voltage V, a command voltage value inside the inverter control unit 21. Furthermore, the output power calculating unit 120b acquires from the current detection unit 40 the output current I from the inverter circuit 11. Furthermore, the output power calculating unit 120b calculates a power factor $\cos\theta$, based on the phase difference $\theta$ between the inverter output voltage V and the output current I.

The command voltage correcting unit 120a corrects the target command voltage Vref generated by the target voltage generating unit 20a, based on the output power P calculated by the output power calculating unit 120b. More specially, the command voltage correcting unit 120a determines, by comparing the output power P with a preset power threshold, whether or not the output power P is larger than the power threshold. The power threshold is set in advance for detection of voltage imbalance by a test with a real machine or other procedures and stored in an internal memory or other units. The command voltage correcting unit 120a reduces the target command voltage Vref in the case where the output power P is larger than the power threshold and increases the target command voltage Vref in the case where the output power P is smaller than the power threshold.

In the case where the output power P is not equal to the power threshold, the command voltage correcting unit 120a may increase or decrease the target command voltage Vref by a predetermined set value. Furthermore, the command voltage correcting unit 120a may set the amount of correction of the target command voltage Vref in accordance with the value of the output power P or the difference between the output power P and the power threshold.

As described above, with the power converter 200A according to Embodiment 2, shortening of the life span of the smoothing capacitor 8 and an increase in the iron loss of the motor can be suppressed, and a stable operation can be achieved, as with the power converter 200 according to Embodiment 1. Furthermore, in the power converter 200A, the command voltage correcting unit 120a corrects the target command voltage Vref in accordance with a change in the output power P obtained by the output power calculating unit 120b, and performs switching of the voltage step-down switching element 5, based on the corrected target command voltage Vref. Therefore, the ripple current in the smoothing capacitor 8 can be reduced within an allowance. Thus, for example, even in the case where the ambient temperature of the smoothing capacitor 8 is high and heat generation of the smoothing capacitor 8 is desired to be suppressed, the ripple current can be reduced. That is, with the power converter 200A, installation in an environment with a high ambient temperature can be achieved, and rating specifications of the smoothing capacitor 8 can be lowered. Therefore, the equipment can be configured more inexpensively. The other effects are similar to those of Embodiment 1.

Embodiment 3

Figure 17:
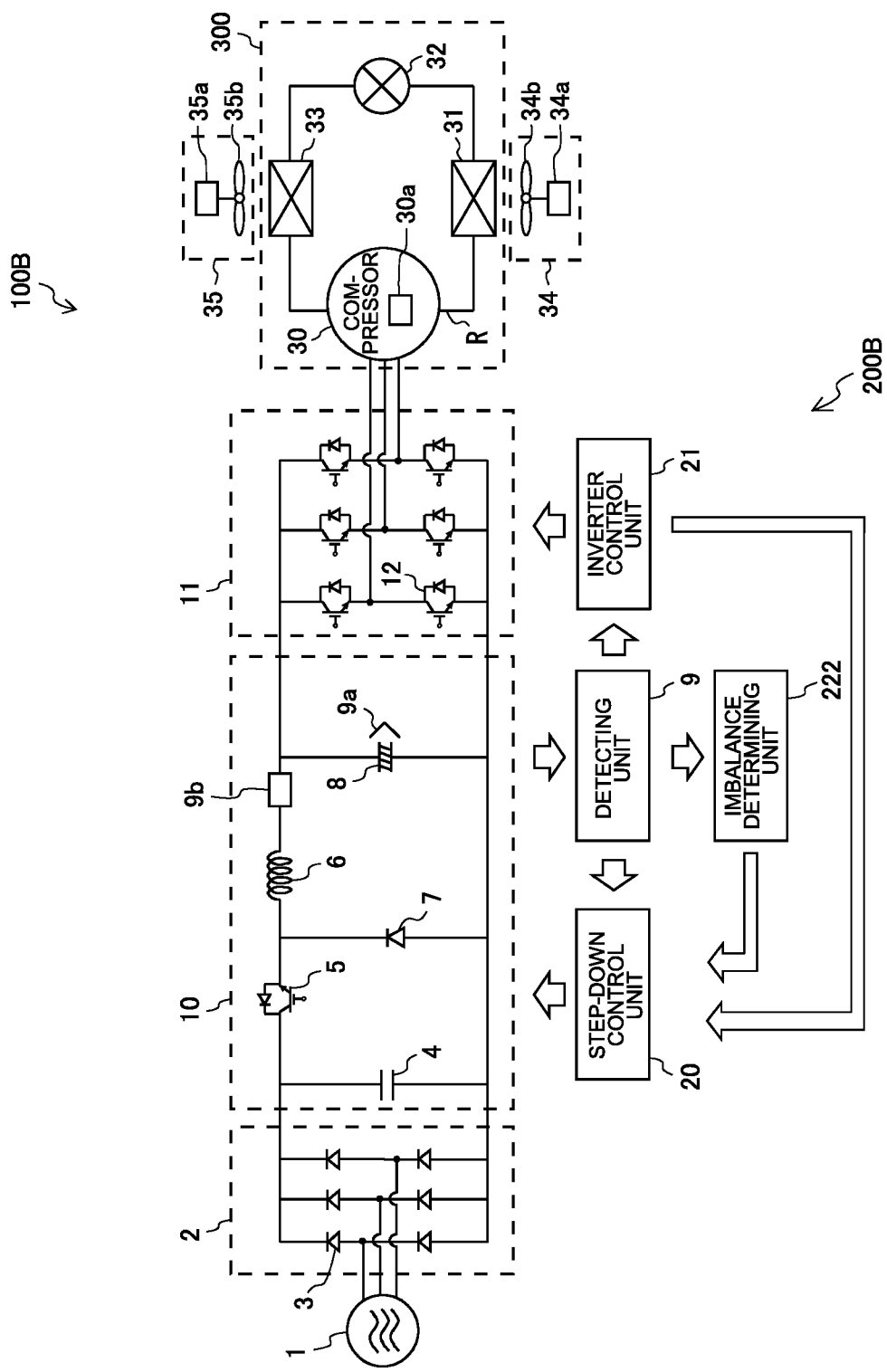
FIG. 17 is a schematic diagram illustrating a configuration of an air-conditioning apparatus that includes a power converter according to Embodiment 3 of the present invention.

FIG. 17 is a schematic diagram illustrating a configuration of an air-conditioning apparatus that includes a power converter according to Embodiment 3 of the present invention. The entire configuration of an air-conditioning apparatus 100B according to Embodiment 3 is similar to that of the air-conditioning apparatus 100 according to Embodiment 1 described above. Therefore, equivalent configurations will be referred to with the same signs, and explanation for those equivalent configurations will be omitted.

In the case where the pulsation width ΔV of the DC bus voltage Vdc in the state in which the voltage step-down circuit 10 is stopped exceeds the voltage determination threshold, the imbalance determining unit 22 according to Embodiment 1 and Embodiment 2 described above determines that voltage imbalance has occurred. In contrast, an imbalance determining unit 222 in Embodiment 3 is configured to determine, based on the value of the current detector 9b, whether or not voltage imbalance has occurred.

Figure 18:
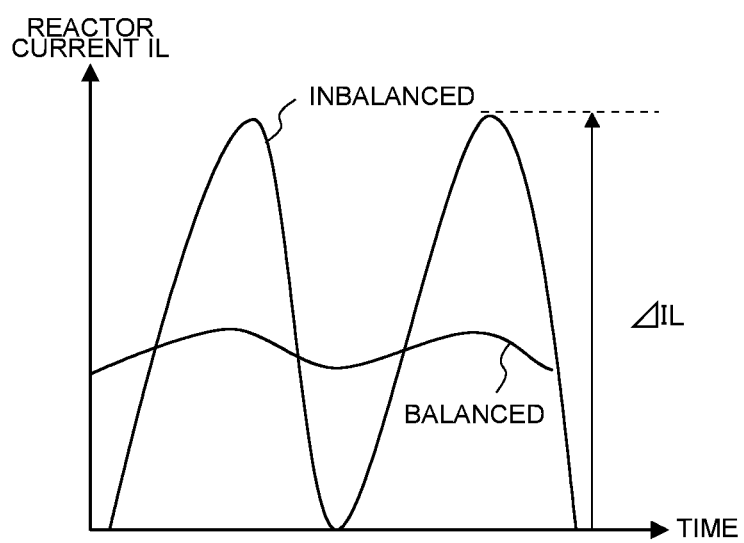
FIG. 18 is a graph illustrating a state of a change in a reactor current in the case where voltage imbalance has occurred in a three-phase AC power supply in the power converter in FIG. 17.

FIG. 18 is a graph illustrating the state of a change in the reactor current in the case where voltage imbalance has occurred in the three-phase AC power supply in the power converter in FIG. 17. In FIG. 18, a change in the reactor current IL with the lapse of time is illustrated, where the horizontal axis represents time and the vertical axis represents the reactor current IL.

As illustrated in FIG. 18, it is known that in the case where voltage is unbalanced, the reactor current IL in the state in which the voltage step-down circuit 10 is stopped fluctuates more significantly than that in the case where voltage is balanced. If the degree of voltage imbalance is large, current does not flow in some periods. During a period in which current does not flow, all the power to be supplied to the inverter circuit 11 comes from power stored in the smoothing capacitor 8. Therefore, ripple current flowing to the smoothing capacitor 8 increases.

Thus, the imbalance determining unit 222 acquires, from the value of the reactor current IL detected by the current detector 9b, the maximum value and the minimum value of the reactor current IL during the acquisition period, and obtains the difference between the maximum value and the minimum value as the pulsation width ΔIL of the reactor current IL. That is, during the acquisition period, the imbalance determining unit 222 acquires the reactor current IL from the current detector 9b, and the maximum value and the minimum value of the reactor current IL during the acquisition period are stored in an internal memory or other units. Then, the imbalance determining unit 222 obtains the difference between the stored maximum value and minimum value as the pulsation width ΔIL. The acquisition period is set within a range, for example, from several ten milliseconds to several hundred milliseconds.

Furthermore, the imbalance determining unit 222 determines, by comparing the pulsation width ΔIL with a preset current determination threshold, whether or not the pulsation width ΔIL is larger than the current determination threshold. The current determination threshold is set in advance for detection of voltage imbalance by a test with a real machine or other procedures and is stored in an internal memory or other units. When the pulsation width ΔIL is larger than the current determination threshold, the imbalance determining unit 222 may determine that voltage imbalance has occurred in the three-phase AC power supply 1. Therefore, the imbalance determining unit 222 outputs an operation instruction signal for issuing an instruction to operate the voltage step-down circuit 10 to the voltage step-down control unit 20.

In the case where the imbalance determining unit 222 determines that voltage imbalance has occurred, if the voltage step-down circuit 10 has already started operation, the reactor current IL is controlled to be constant (ΔIL≈0). Therefore, it is desirable that the imbalance determining unit 222 monitor the operating state of the voltage step-down control unit 20 or the voltage step-down circuit 10, so that the determination as to whether or not voltage imbalance has occurred can be performed only in the state in which the voltage step-down circuit 10 is not operating.

As described above, with the power converter 200B according to Embodiment 3, shortening of the life span of the smoothing capacitor 8 and an increase in the iron loss of the motor can be suppressed, and a stable operation can be achieved, as with the power converter 200 according to Embodiment 1. In the case where voltage is unbalanced, the reactor current IL in the state in which the voltage step-down circuit 10 is stopped fluctuates more significantly than that in the case where voltage is balanced. In this respect, in the case where the pulsation width ΔI during the acquisition period of the reactor current IL is larger than the current determination threshold, the imbalance determining unit 222 detects voltage imbalance in the three-phase AC power supply 1. Thus, the accuracy of detection of voltage imbalance can be increased.

Furthermore, as described above, when the reactor current IL is discontinuous, the maximum value of the reactor current IL increases. Therefore, loss in the rectifier diode elements 3 of the three-phase rectifier 2, through which current flows, and in the voltage step-down switching element 5 increases. In contrast, in Embodiment 3, by operating the voltage step-down circuit 10 according to the size of the pulsation width ΔIL of the reactor current IL, the reactor current IL, that is, a current flowing to the rectifier diode elements 3 and the voltage step-down switching element 5 can be smoothed. Thus, each semiconductor element can be avoided from reaching thermal destruction. Furthermore, each semiconductor element may be replaced with an element with a lower current specification value. Therefore, a reduction in the cost of equipment can be achieved. The imbalance determining unit 222 in Embodiment 3 may be used in the power converter 200B in Embodiment 2, instead of the imbalance determining unit 222. Other effects are similar to those in Embodiments 1 and 2.

Each of Embodiments 1, 2, and 3 are preferred specific examples of a power converter, a compressor, an air-sending device, and an air-conditioning apparatus, and the present invention is not intended to be limited to these modes. For example, in FIGS. 1, 14, and 17, examples in which the power converters 200, 200A, and 200B drive the compressor motor 30a are illustrated. However, the present invention is not limited to these examples. The power converters 200, 200A, and 200B may drive any one of the fan motor 34a and the fan motor 35a. That is, the first air-sending device 34 may include the power converter according to each of Embodiments 1, 2, and 3 and the fan motor 34a driven by the power converter. In a similar manner, the second air-sending device 35 may include the power converter according to each of Embodiments 1, 2, and 3 and the fan motor 35a driven by the power converter.

Furthermore, in Embodiments 1, 2, and 3, examples in which the air-conditioning apparatuses 100, 100A, and 100B include a single power converter are illustrated. However, the present invention is not limited to these examples. The air-conditioning apparatuses 100, 100A, and 100B may include a plurality of power converters. In the case where each of the air-conditioning apparatuses 100, 100A, and 100B includes, for example, two power converters, the power converter may drive two of the compressor motor 30a, the fan motor 34a, and the fan motor 35a. In the case where each of the air-conditioning apparatuses 100, 100A, and 100B includes, for example, three power converters, the power converter may drive the compressor motor 30a, the fan motor 34a, and the fan motor 35a. Furthermore, although an example in which a power converter is mounted on an air-conditioning apparatus is illustrated in each of Embodiments 1, 2, and 3, the present invention is not limited to this example. For example, the power converter according to each of Embodiments 1, 2, and 3 may be configured to drive a motor provided in other apparatuses such as a refrigerator, a washing machine, or an automobile. Furthermore, a power converter according to each of Embodiments 1, 2, and 3 may be used to drive a fluorescent lamp or an IH cooking heater.

The invention claimed is:

1. A power converter comprising:
a rectifier rectifying a three-phase AC voltage supplied from a three-phase AC power supply;
a voltage step-down circuit including a voltage step-down switching element, a reactor, a backflow prevention element, and a smoothing capacitor and stepping down a DC voltage supplied from the rectifier;
an inverter circuit converting the DC voltage smoothed by the smoothing capacitor into an AC voltage; and
a processor;
the processor being configured to
control an operation of the voltage step-down circuit; and
determine whether or not voltage imbalance has occurred in the three-phase AC power supply,
wherein the processor is configured to
perform switching of the voltage step-down switching element in response to the processor determining that the voltage imbalance has occurred.

2. The power converter of claim 1, further comprising:
a voltage sensor detecting a DC bus voltage, which is a voltage across the smoothing capacitor,
wherein the processor is configured to
calculate a duty ratio of ON and OFF operations of the voltage step-down switching element, based on the DC bus voltage detected by the voltage sensor.

3. The power converter of claim 2,
wherein the processor is configured to
generate a target command voltage as an attainment target for the DC bus voltage, in accordance with output to the inverter circuit.

4. The power converter of claim 3,
wherein the processor is configured to
obtain a modulation factor indicating a proportion of the output voltage from the inverter circuit in the DC bus voltage, and to
adjust a value of the target command voltage in accordance with a change in the modulation factor obtained by the processor.

5. The power converter of claim 4,
wherein the processor is configured to
set, in a case where the modulation factor is greater than 1, the target command voltage to an average value of a pulsation width of the DC bus voltage in a state in which the voltage step-down circuit is stopped.

6. The power converter of claim 3,
wherein the processor is configured to
correct the target command voltage in accordance with output power from the inverter circuit and control a ripple current flowing to the smoothing capacitor.

7. The power converter of claim 1, further comprising:
a voltage sensor detecting a DC bus voltage, which is a voltage across the smoothing capacitor, and
a current sensor detecting a reactor current, which is a current flowing in the reactor,
wherein the processor is configured to
calculate a duty ratio of ON and OFF operations of the voltage step-down switching element, based on the DC bus voltage detected by the voltage sensor and the reactor current detected by the current sensor.

8. The power converter of claim 1, further comprising:
a voltage sensor detecting a DC bus voltage, which is a voltage across the smoothing capacitor,
wherein the processor is configured to
determine that the voltage imbalance has occurred in the three-phase AC power supply in a case where a pulsation width during an acquisition period of the DC bus voltage detected by the voltage sensor is larger than a voltage determination threshold.

9. The power converter of claim 1, further comprising:
a current sensor detecting a reactor current, which is a current flowing in the reactor,
wherein the processor is configured to
determine that the voltage imbalance has occurred in the three-phase AC power supply in a case where a pulsation width during an acquisition period of the reactor current detected by the current sensor is larger than a current determination threshold.

10. The power converter of claim 1,
wherein at least one of the voltage step-down switching element and the backflow prevention element is a relay performing switching partially for a power supply period.

11. The power converter of claim 1,
wherein at least one of the voltage step-down switching element and the backflow prevention element includes a wide band gap semiconductor.

12. The power converter of claim 11,
wherein the wide band gap semiconductor is a silicon carbide element, a gallium-nitride-based element, or a diamond element.

13. An air-conditioning apparatus comprising:
the power converter of claim 1;
a motor driven by the power converter.

14. An air-conditioning apparatus comprising:
the power converter of claim 1; and
a refrigerant circuit configured such that a compressor including a compressor motor driven by the power converter, a condenser, an expansion device, and an evaporator are connected by a refrigerant pipe.

15. The power converter of claim 1,
wherein the processor determines whether or not the voltage imbalance has occurred in the three-phase AC power supply based on a state of the voltage step-down circuit.

16. The power converter of claim 1,
wherein the processor determines whether or not the voltage imbalance has occurred in the three-phase AC power supply based on a state of the smoothing capacitor of the voltage step-down circuit.

17. The power converter of claim 1,
wherein the processor determines whether or not the voltage imbalance has occurred in the three-phase AC power supply based on a state of the reactor of the voltage step-down circuit.

\* \* \* \* \*